(12) United States Patent
Sutton et al.

(10) Patent No.: US 10,023,338 B2
(45) Date of Patent: Jul. 17, 2018

(54) BOTTLE CARRIER AND CASE PACKAGING MACHINE

(71) Applicant: Combi Packaging Systems, LLC, Canton, OH (US)

(72) Inventors: Jovan J. Sutton, Kensington, OH (US); Robert S. Heath, III, Hartville, OH (US); Jason S. Mitchell, Alliance, OH (US); Michael Brian Roy Williams, Clinton, OH (US); Carl J. Maxfield, Canton, OH (US)

(73) Assignee: Combi Packaging Systems, LLC., Canton, OH (US)

( * ) Notice: Subject to any disclaimer, the term of this patent is extended or adjusted under 35 U.S.C. 154(b) by 0 days.

(21) Appl. No.: 15/393,468

(22) Filed: Dec. 29, 2016

(65) Prior Publication Data

US 2017/0313452 A1 Nov. 2, 2017

Related U.S. Application Data

(60) Provisional application No. 62/329,495, filed on Apr. 29, 2016.

(51) Int. Cl.
| | |
|---|---|
| *B65B 43/42* | (2006.01) |
| *B65B 35/54* | (2006.01) |
| *B65B 21/14* | (2006.01) |
| *B65B 43/52* | (2006.01) |
| *B65B 43/30* | (2006.01) |
| *B65B 51/06* | (2006.01) |

(Continued)

(52) U.S. Cl.
CPC .............. *B65B 43/42* (2013.01); *B65B 21/14* (2013.01); *B65B 35/54* (2013.01); *B65B 43/305* (2013.01); *B65B 43/52* (2013.01); *B65B 51/06* (2013.01); *B65B 65/006* (2013.01); *B65B 65/02* (2013.01); *B65G 13/00* (2013.01); *B65G 15/00* (2013.01); *B65G 47/912* (2013.01)

(58) Field of Classification Search
CPC ................................ B65B 43/42; B65B 35/54
See application file for complete search history.

(56) References Cited

U.S. PATENT DOCUMENTS

| 3,634,996 A | * | 1/1972 | Reichert | ................. | B65B 21/16 |
| | | | | | 53/248 |
| 3,848,519 A | * | 11/1974 | Ganz | ..................... | B65B 21/242 |
| | | | | | 493/312 |

(Continued)

*Primary Examiner* — Thomas Randazzo
(74) *Attorney, Agent, or Firm* — Sand & Sebolt

(57) ABSTRACT

A device, system, and method for loading empty and formed six-pack bottle carriers into a larger case (i.e. a multi-pack) is provided. The packaging device includes an upper portion and a lower portion. The six-pack carriers are formed by unfolding them in the upper portion. Various components are associated with the upper portion of the packaging device. The case receives a plurality of six-pack carriers therein. The larger cases is formed by unfolding them in the lower portion of the packaging device. Various components are associated with the lower portion of the packaging device. The upper portion and lower portion operate simultaneously to efficiently produce a case have empty six-pack carriers placed therein for later filling with bottles at a downstream destination. The system includes the machine, the cases, the six-pack carriers, and the bottles, operating collectively.

19 Claims, 33 Drawing Sheets

(51) Int. Cl.
    *B65B 65/00*    (2006.01)
    *B65B 65/02*    (2006.01)
    *B65G 13/00*    (2006.01)
    *B65G 15/00*    (2006.01)
    *B65G 47/91*    (2006.01)

(56) References Cited

U.S. PATENT DOCUMENTS

| | | | | |
|---|---|---|---|---|
| 5,361,889 | A * | 11/1994 | Howell | B65G 47/44 |
| | | | | 198/357 |
| 7,552,570 | B2 * | 6/2009 | Raudat | B65B 21/06 |
| | | | | 53/235 |
| 9,586,705 | B2 * | 3/2017 | Raudat | B65B 5/06 |
| 2011/0030311 | A1 * | 2/2011 | Martini | B65B 17/025 |
| | | | | 53/154 |
| 2016/0107781 | A1 * | 4/2016 | Hutter | B65B 43/54 |
| | | | | 53/467 |

\* cited by examiner

BOTTLE CARRIER AND CASE PACKAGING MACHINE

CROSS-REFERENCE TO RELATED APPLICATIONS

This application claims priority to prior U.S. Provisional Patent Application Ser. No. 62/329,495, filed on Apr. 29, 2016; the disclosure of which is entirely incorporated herein by reference.

BACKGROUND

Technical Field

Generally, the present disclosure relates to a packaging machine and particularly to a bottle carrier and multi-pack case loading machine. Specifically, the current disclosure is directed to a bottle carrier packaging machine, wherein an individual bottle carrier is inserted into a large case so that the case is enabled to accept a number of bottles simultaneously.

Background Information

In order to load bottles into a carrier (i.e., a four-pack carrier or a six-pack carrier), a person or machine must individually unfold each bottle carrier to make it rectangular to hold a number of bottles simultaneously. Furthermore, if the carrier loaded with bottles needs to be placed into a larger multi-pack case, the carrier must be loaded into the case while carrying the bottles. This process takes significant effort and time since unfolding the bottle carrier and loading it with bottles, and then placing the loaded bottle carrier into the case requires two different steps to complete. Furthermore, the large case requires applying a plastic adhesive tape outside of the case.

SUMMARY

Issues continue to exist with loading bottle carriers into cases, and it is desired in the art to provide a device for unfolding each bottle carrier and a large case, inserting the individual bottle carrier into the large case, and applying a plastic adhesive around the large case at the same time without further assisting from an individual. The present disclosure addresses these and other issues.

In accordance with one aspect of the present disclosure, an exemplary embodiment may provide a packaging machine configured to load empty bottle carriers into a larger case, the machine comprising: a first portion of the machine associated with forming the bottle carriers; a second portion of the machine associated with forming the larger case; and a combining assembly located at a junction of a bottle carrier first pathway and a larger case second pathway, wherein a plurality of formed empty bottle carriers are placed into the larger case at a combining assembly.

In accordance with another aspect of the present disclosure, an exemplary embodiment may provide a method of packing a case with empty bottle carriers comprising the steps of: (1) performing the following first set of steps in a first portion of a packaging machine: (a) forming an empty bottle carrier configured to hold a number of bottles in a range from 4 to 6 bottles; (2) Simultaneous to (1), performing the following second set of steps in a second portion of the same packaging machine: (a) forming a case having an area at least four times larger than the bottle carrier; and (3) loading the empty bottle carrier into the case adapted for later filling with bottles into the carrier previously disposed in the case.

In accordance with another aspect of the present disclosure, an exemplary embodiment may provide a method of forming a case filled with empty bottle carriers comprising the steps of: unfolding a folded first carrier from a plurality of folded carriers; unfolding a folded second carrier from the plurality of folded carriers, wherein a first portion of a packaging machine accomplishes the steps of unfolding the folded first and second carriers; moving the unfolded first carrier along a first portion of a first pathway to a loading zone; moving the unfolded second carrier along a second portion of the first pathway to the loading zone, wherein the first and second carriers are empty and arranged side-by-side in the loading zone; inserting the first and second carrier into a larger case; and inserting bottles into empty slots formed in the first and second carriers.

In accordance with another aspect of the present disclosure, an exemplary embodiment may provide a packaging machine having offset paths comprising: a first path for moving empty bottle carriers and transforming the empty bottles carriers from a folded first position to an unfolded second position, wherein the carrier unfolded second position is adapted to receive bottles in slots defined by the bottle carrier; and a second path offset from the first path for moving larger cases and transforming the cases from a folded first position to an unfolded second position, wherein the case unfolded second position is adapted to received empty unfolded bottle carriers therein.

In accordance with another aspect of the present disclosure, an exemplary embodiment may provide a packaging machine configured to load empty bottle carriers into a larger case, the machine comprising: an empty six-pack bottle carrier first pathway; a larger case second pathway offset from the first pathway; and a combining assembly located at a junction of the first pathway and the second pathway, wherein a plurality of empty bottle carriers are placed into the larger case at the combining assembly.

In accordance with another aspect of the present disclosure, an exemplary embodiment may provide a packaging machine having offset paths comprising: a first conveying pathway for moving empty assembled bottle carriers from an upstream first position to a downstream second position; and a second conveying pathway offset from the first conveying pathway for moving empty assembled bottle carriers from the upstream first position to the downstream second position.

In accordance with another aspect of the present disclosure, an exemplary embodiment may provide a method of moving empty assembled bottle carriers from an upstream first position to a downstream second position comprising the steps of: providing a first bottle carrier pathway and an offset second bottle carrier pathway; moving a first empty assembled bottle carrier along the first pathway; moving a second empty assembled bottle carrier along the second pathway; queuing the first and second bottle carriers in a loading zone downstream from the first and second pathways.

In accordance with another aspect of the present disclosure, an exemplary embodiment may provide a device, system, and method for loading empty and formed six-pack bottle carriers into a larger case. The packaging device can include an upper portion and a lower portion. The six-pack carriers may be formed by unfolding them in the upper portion. Various components are associated with the upper portion of the packaging device. A larger case receives a plurality of six-pack carriers or four-pack carriers therein. The larger case is formed by unfolding it in the lower portion of the packaging device. Various components are associated with the lower portion of the packaging device. The upper portion and lower portion operate simultaneously to efficiently produce a case having empty six-packs or four-packs placed therein for later filling with bottles at a downstream destination. The system includes the machine, the cases, the six-pack (or four-packs) carriers, and the bottles, operating collectively.

BRIEF DESCRIPTION OF THE DRAWINGS

A sample embodiment of the disclosure is set forth in the following description, is shown in the drawings and is particular and distinctly pointed out and set forth in the appended claims. The accompanying drawings, which are fully incorporated herein and constitute a part of the specification, illustrate various examples, methods, and other example embodiments of various aspects of the invention. It will be appreciated that the illustrated element boundaries (e.g., boxes, group of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3 depicts a diagrammatic representation showing that FIG. 3A, FIG. 3B, and FIG. 3C should be aligned to form a global top view of the upper portion of the packaging machine wherein

FIG. 3A depicts an enlarged top plan view of the upper portion of the packaging machine;

FIG. 3C depicts an enlarged top plan view of the upper portion of the packaging machine further downstream from the view of FIG. 3B;

FIG. 23 depicts an end elevation view similar to that of FIG. 8 depicting the operation of rotatable flaps pivoting downward to define a chute that the bottle carriers pass through;

Similar numbers refer to similar parts throughout the drawings.

DETAILED DESCRIPTION OF THE EMBODIMENT

The present disclosure relates to a packaging machine which can be used to insert one or more bottle carriers into a large case so that an operator or a bottling machine can load a number of bottles into empty slots formed in the bottle carriers disposed within in the large case which is ready to ship as soon as bottles are loaded. Because the individual bottle carrier was previously disposed in the large case, there is no further operation by an operator or a machine after the bottles are loaded into the bottle carriers. This is in contradistinction to currently known devices which require bottle carriers to be loaded with bottles then the loaded bottle carrier to be placed into a large case. The packaging machine is generally indicated at 10.

As depicted throughout the figures, X-axis, Y-axis, Z-axis coordinates are provided for reference purposes to assist with the description of components relative to each other and the direction along which axis they may move or perform a stated function. However, it is to be understood that these axes are for descriptive purposes only and are not to be construed as limiting the disclosure to that direction. Generally, the X-axis is associated with a longitudinal direction of machine 10, the Y-axis is associated with a transverse direction associated with machine 10, and the Z-axis is associated with a vertical direction of machine 10.

Figure 1:
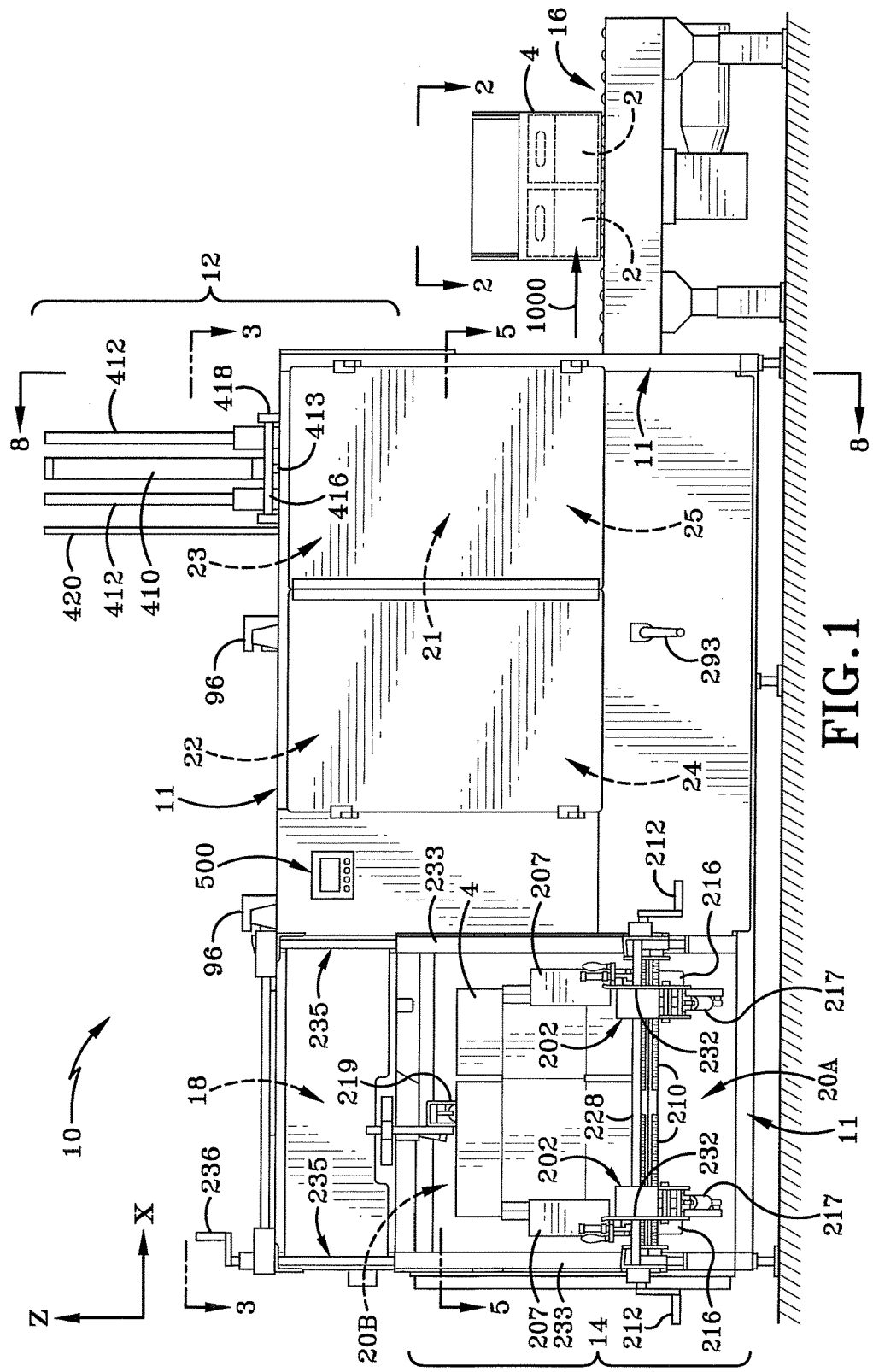
FIG. 1 depicts a side elevation view of a packaging machine including an upper portion defining a first pathway and a lower portion defining a second pathway in accordance with the present disclosure.
Figure 2:
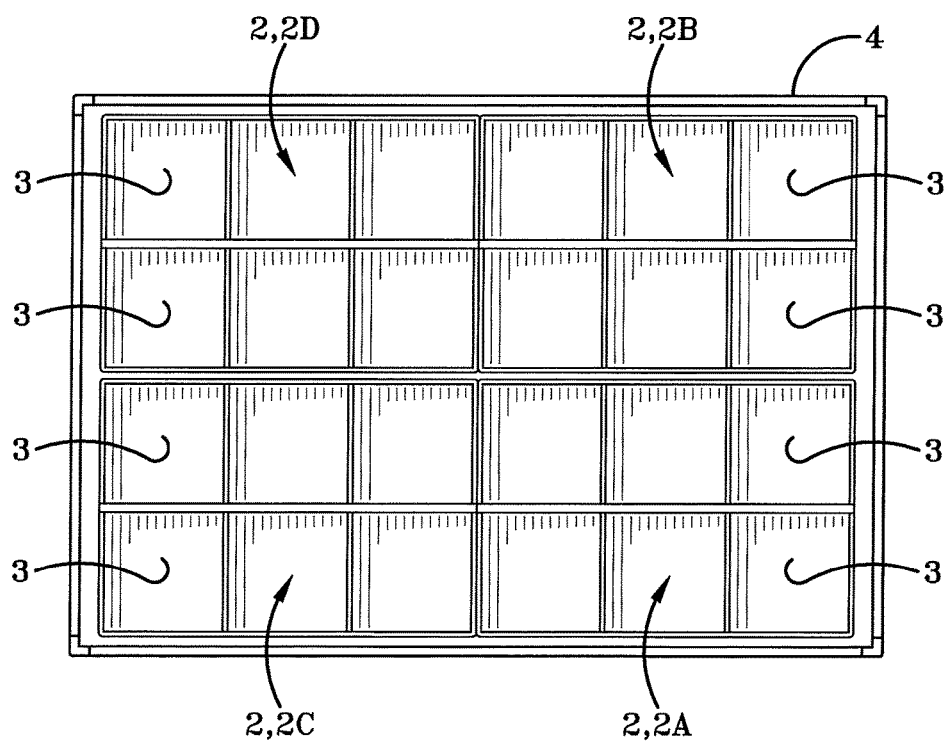
FIG. 2 depicts a top plan view taken along line 2-2 in FIG. 1 depicting a large case filled with empty bottle carriers.

As depicted in FIG. 1, a packaging machine 10 may comprise an upper portion 12 and a lower portion 14. A discharging portion 16 may cooperate downstream with packaging machine 10. The upper portion 12 is generally associated with unfolding one or more bottle carriers (FIG. 2). The lower portion 14 is generally associated with unfolding one or more large packages or large cases 4 (FIG. 2). The large case 4 may also be referred to herein as a "multi-pack case."

Figure 5:
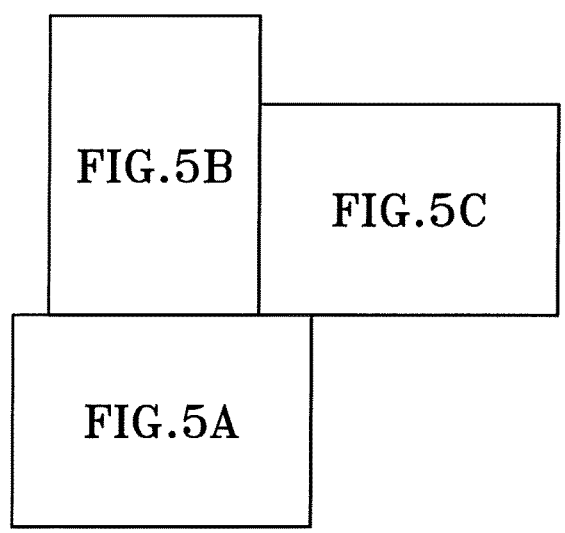
FIG. 5 depicts a diagrammatic representation of the lower portion of the packaging machine indicating that the enlarged top plan views of FIG. 5A, FIG. 5B, and FIG. 5C should be arranged in the orientation shown to reveal the detailed components of the lower portion of the packaging machine.
Figure 5A:
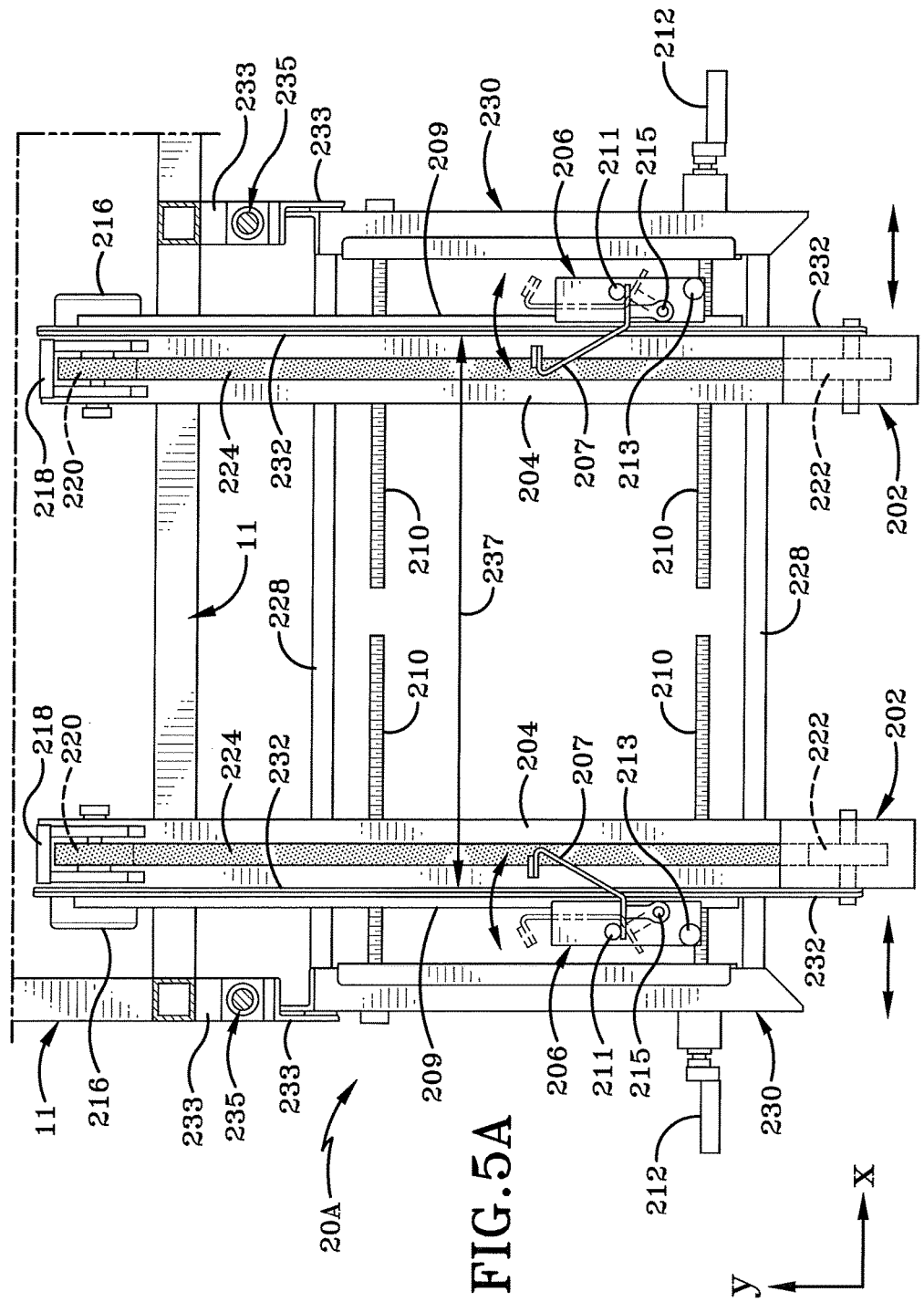
FIG. 5A depicts a top plan view of components of the lower portion of the packaging machine which are associated with the larger case that receives the bottle carriers.
Figure 5B:
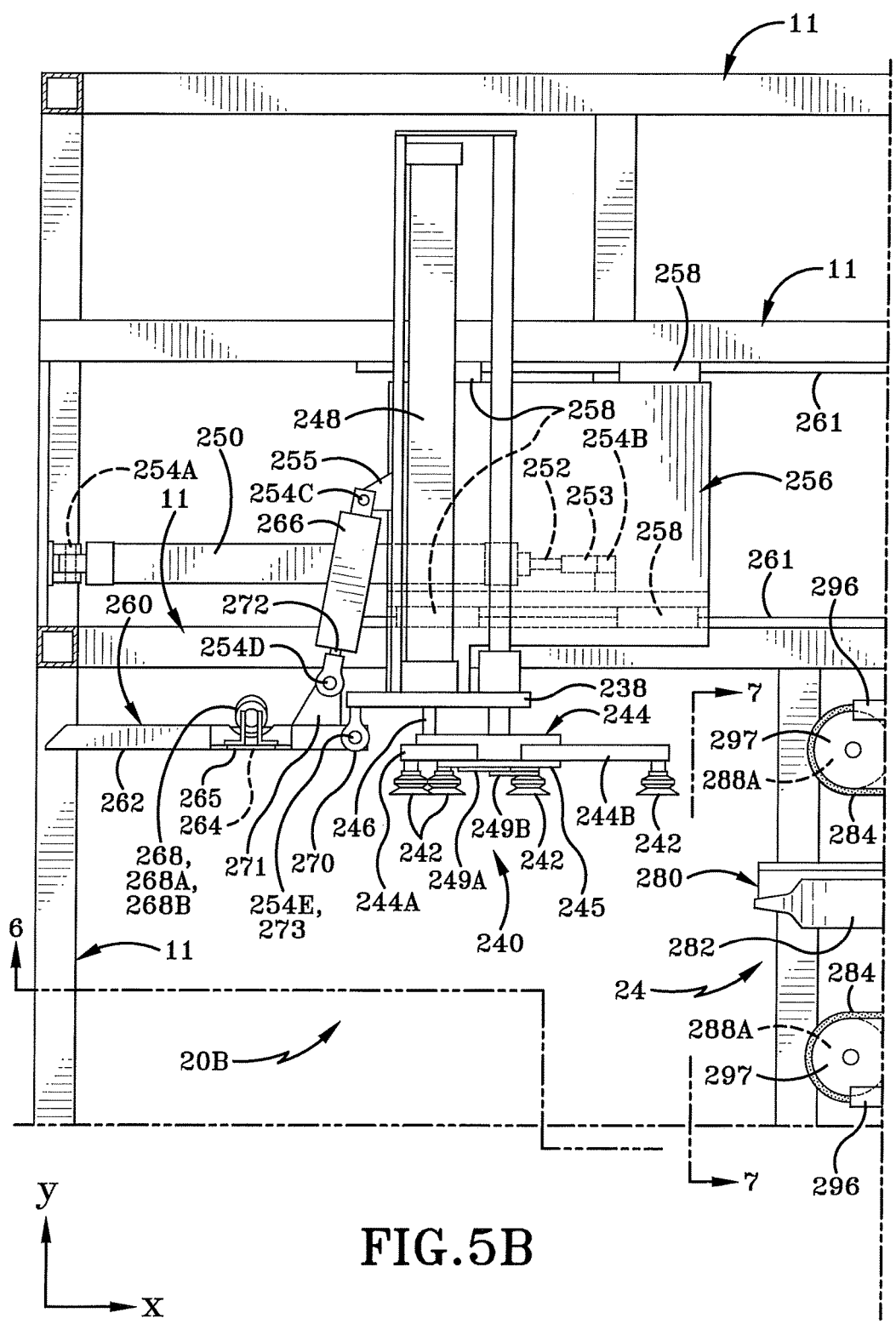
FIG. 5B depicts a top plan view of components downstream from those depicted in FIG. 5A and also associated with unfolding the large case from a folded position to an unfolded position.
Figure 5C:
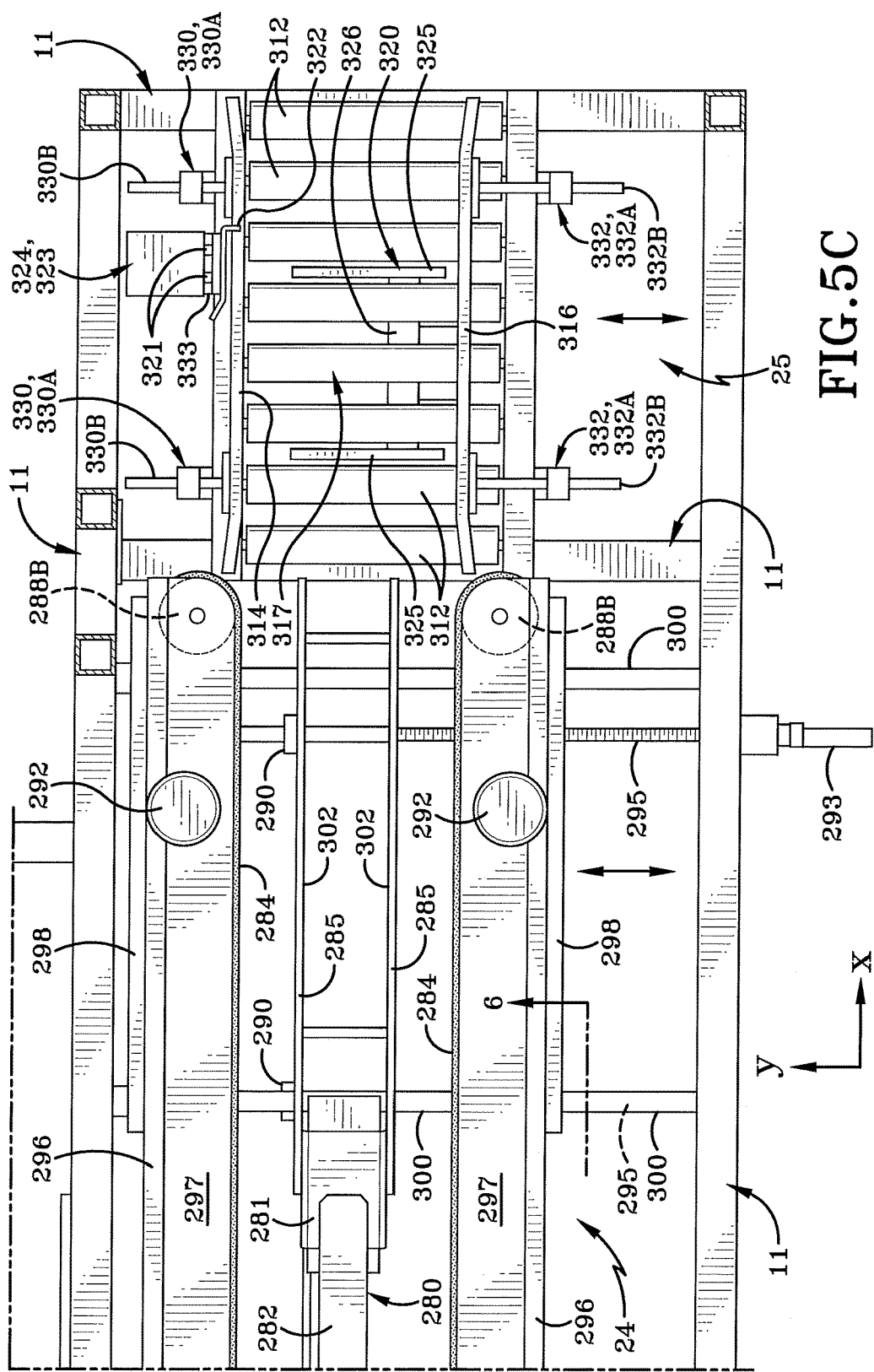
FIG. 5C depicts an enlarged top plan view of components of the lower portion of the packaging machine positioned downstream from those identified in FIG. 5B for carrying the folded large case to a combining assembly.
Figure 8:
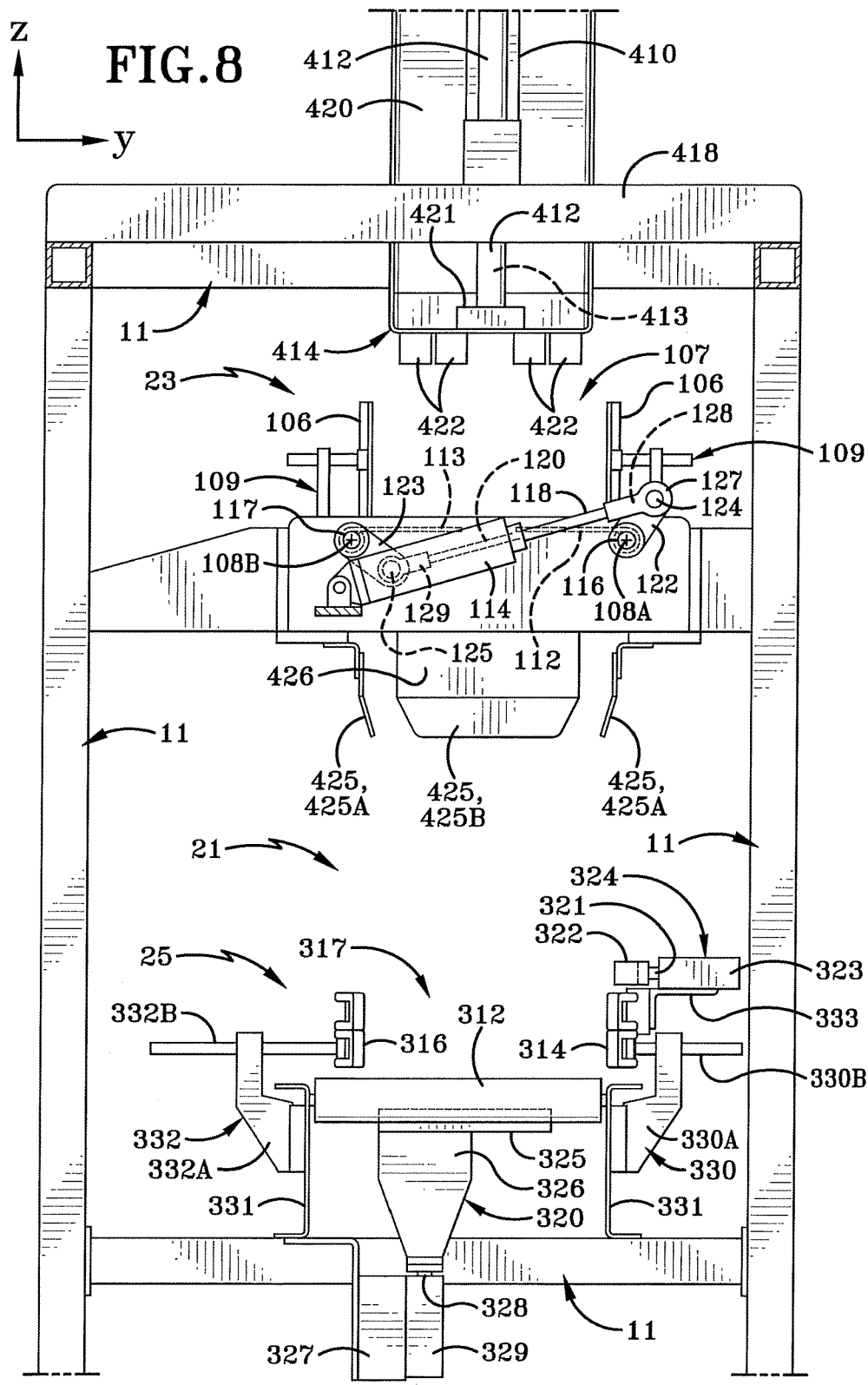
FIG. 8 depicts an end elevation view taken line 8-8 of FIG. 1.

Upper portion 12 comprises a bottle carrier loading module 18 (FIG. 3A) for loading one or more bottle carrier 2, a bottle carrier conveying module 22 (FIG. 3A and FIG. 3B) for carrying bottle carrier 2, and a dropping module 23 (FIG. 3C) for dropping bottle carrier 2 to lower portion 14. Lower portion 14 comprises a large case loading module 20A (FIG. 5A), a large case unfolding module 20B (FIG. 5B), and a large case conveying module 24 (FIG. 5C), and a receiving module 25 (FIG. 5C). Furthermore, dropping module 23 and receiving module 25 collectively define a combining assembly 21 (FIG. 8).

One or more bottle carriers 2 may move along a first pathway 800 defined in upper portion 12. Portions of first pathway 800 are defined by the use of a conveyor belt or similar system. At the same time or similar time, one or more large cases 4 may move along a second pathway 900 defined by lower portion 14 which uses a conveyor belt or similar system. At one point, one or more bottle carriers 2 are inserted in large cases 4 at a pathway junction 950 to thereafter move together along a combined pathway 1000.

The first pathway 800 is located in the first or upper portion 12 of machine 10 and generally begins at a carrier storage assembly 30. The first pathway 800 is defined partially by a first suction assembly, a second suction assembly, a conveyor assembly, and a dropping module (each of which is described in greater detail below). The second pathway 900 is located in the second or lower portion 14 of machine 10 and generally begins at a case loading module 20A. The second pathway 900 is partially defined by a case unfolding module 20B, a conveyor assembly, and the receiving and lifting module 25. The pathway junction 950 wherein first pathway 800 merges with second pathway 900 is located at the combining assembly 21 when the dropping module 23 and the receiving and lifting module 25 unite to place unfolded, formed, and empty carriers 2 into larger case 4. The combined pathway 1000 enables movement of large case 4 having empty carriers 2 placed therein.

As depicted in FIG. 2, an assembled large case having four unfolded and formed bottle carriers 2A-2D retained therein is provided. Each empty bottle carrier 2 forms a plurality of vertically aligned empty slots 3 which are configured to receive a bottle therein. The operational description thereof will be described in greater detail below. Particularly, there is a first bottle carrier 2A, a second bottle carrier 2B, a third bottle carrier 2C, and a fourth bottle carrier 2D. Bottle carrier 2 can be arranged in a 2×2 array carrier 2 may carry six bottles at a time. Thus, in one embodiment, large case 4 can carry a total of 24 bottles at a time, however it is easily understood that other configurations are entirely possible. Furthermore, additional embodiments may utilize a bottle carrier that holds four bottles (thus having four empty slots). In this instance, the bottle carriers would be arranged in a 2×3 array and the large case 4 would still carry a total of 24 bottles.

Figure 3:
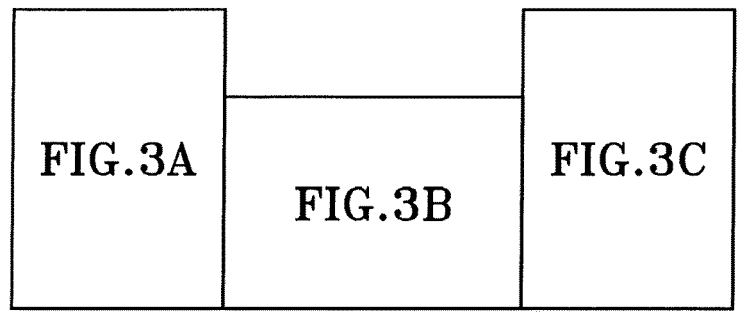
Figure 4:
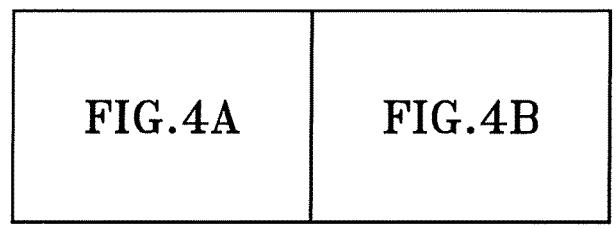
FIG. 4 depicts a diagrammatic view indicating that the side elevation views of FIG. 4A and FIG. 4B should be arranged in landscape orientation side-by-side to reveal an enlarged side view taken along line 4-4 in FIG. 3A, FIG. 3B, and FIG. 3C, respectively.
Figure 3A:
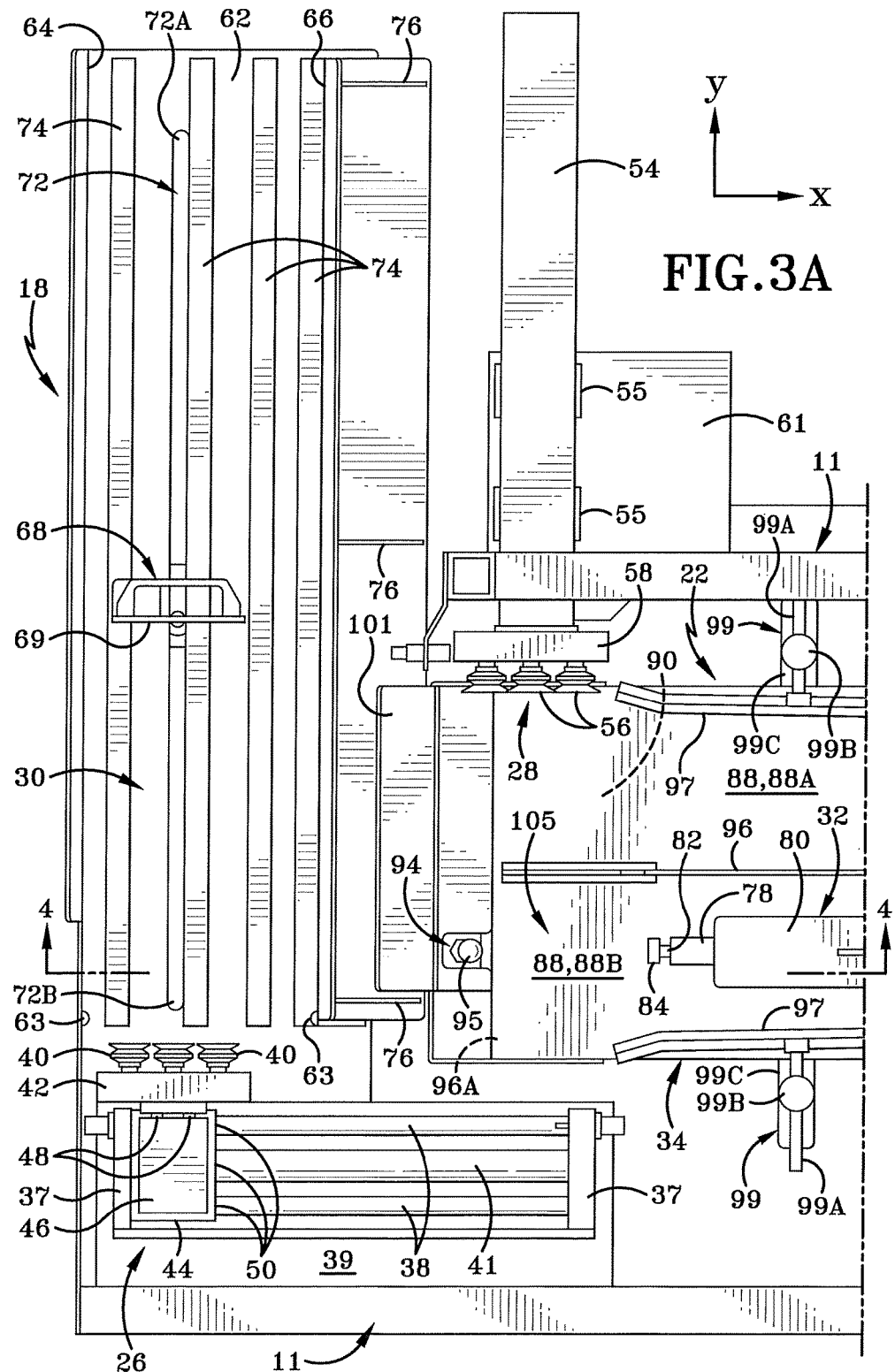
FIG. 3A and FIG. 3C are to be oriented in portrait view and FIG. 3B interposed therebetween in landscape orientation.
Figure 3B:
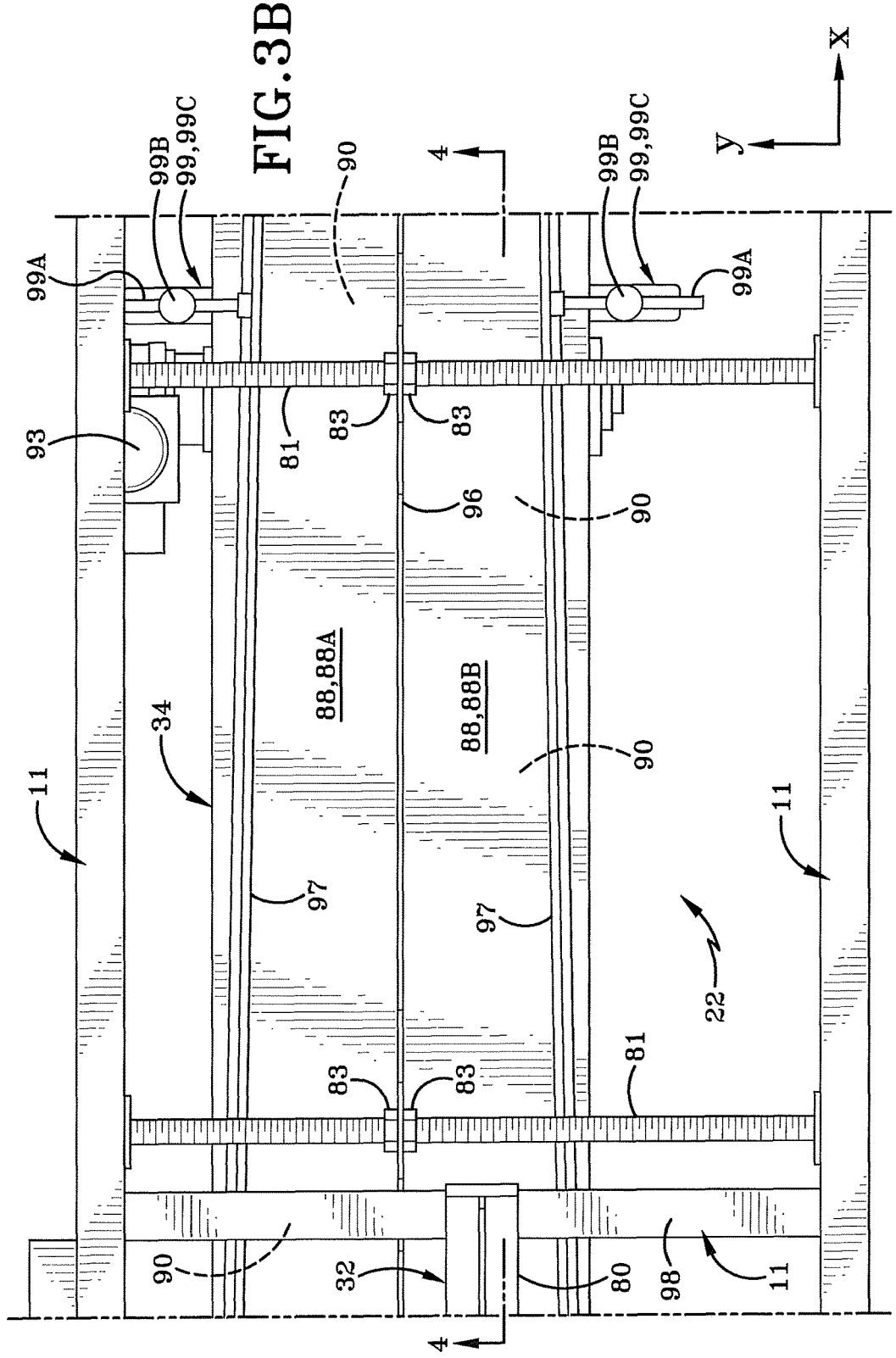
FIG. 3B depicts an enlarged top plan view of the upper portion of the packaging machine further downstream from the view of FIG. 3A.
Figure 3C:
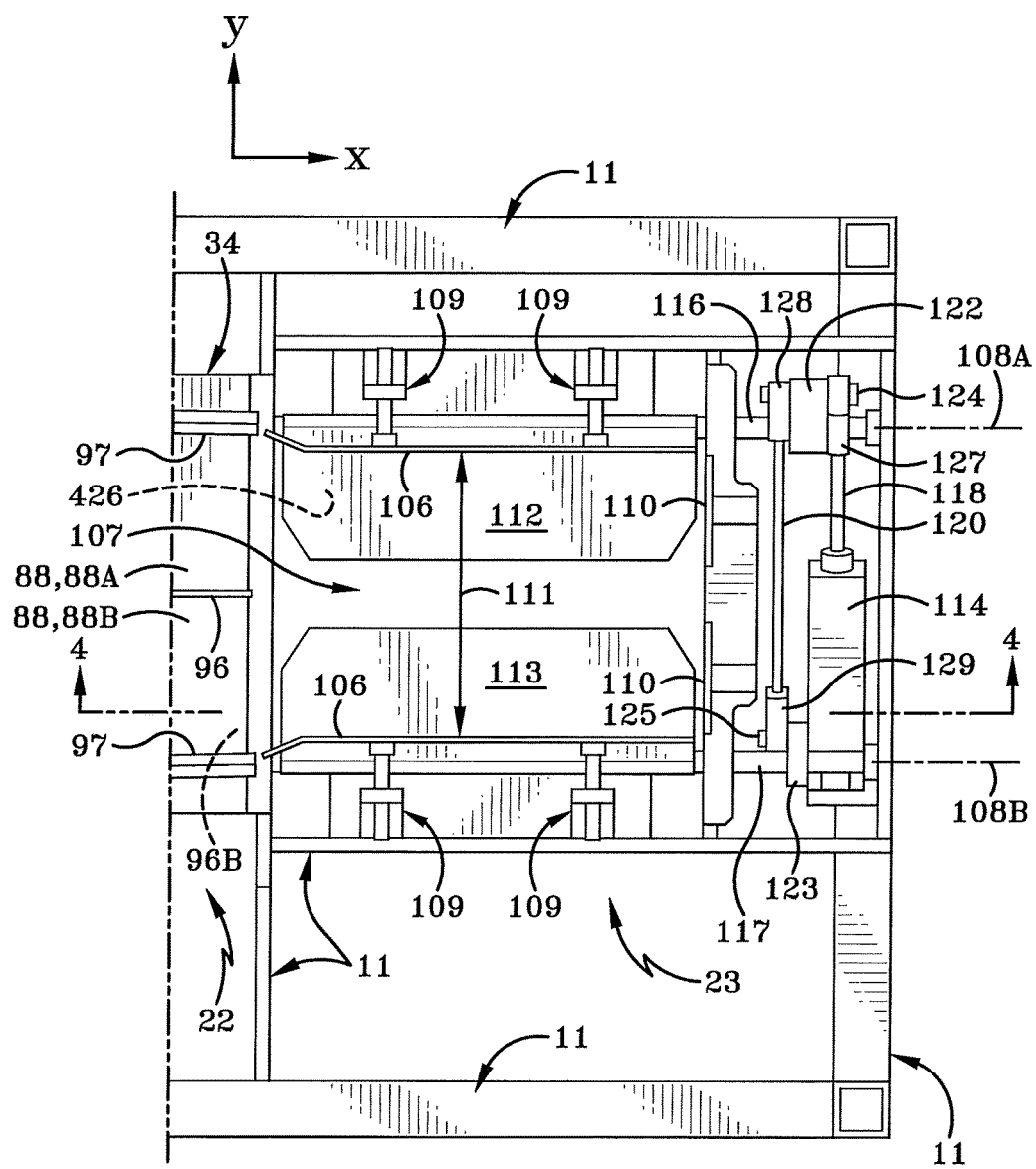
Figure 4A:
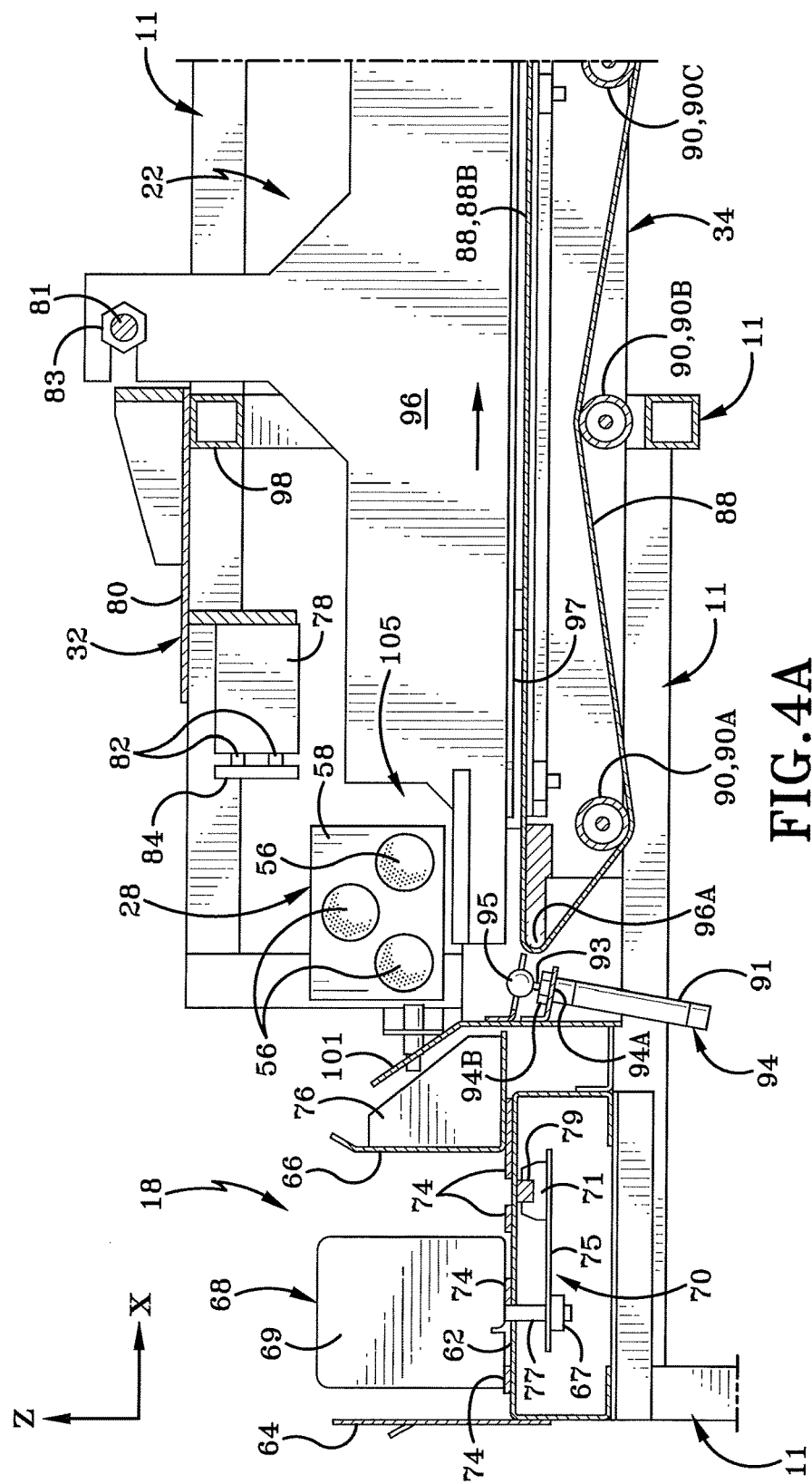
FIG. 4A depicts an enlarged side elevation view depicting components of the upper portion of the packaging machine.
Figure 4B:
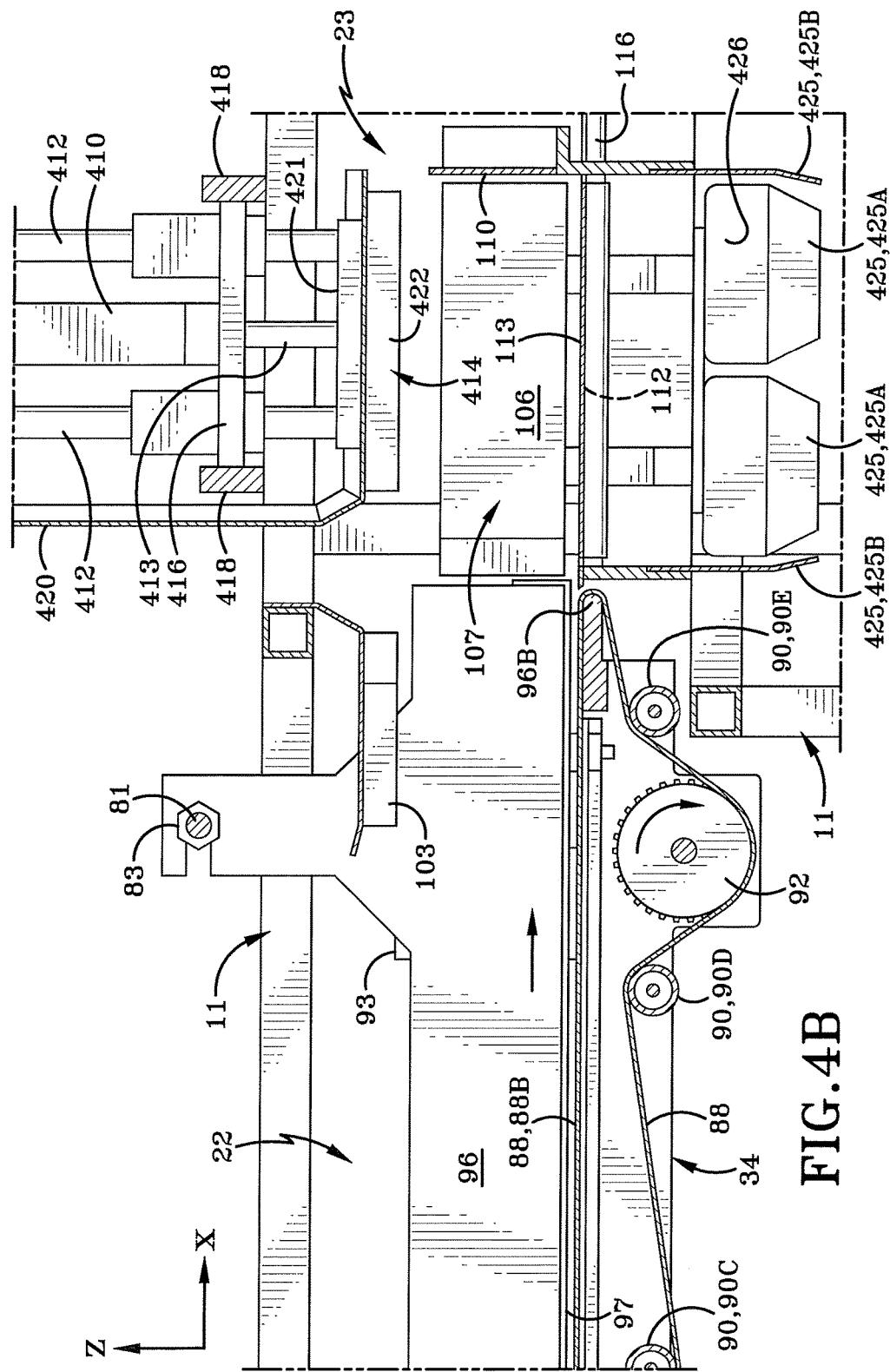
FIG. 4B depicts an enlarged side elevation view depicting components of the upper portion of the packaging machine downstream from the components identified in FIG. 4A.

FIG. 3 is a schematic representation indicating that FIG. 3A, FIG. 3B, and FIG. 3C are enlarged views that should be aligned as shown to reveal a top plan view of upper portion 12 of packaging machine 10. Similarly, FIG. 4 is a schematic representation indicating that FIG. 4A and FIG. 4B are enlarged views that should be aligned as shown to reveal a side plan view of upper portion 12 of bottle carrier packaging machine 10. Similarly, FIG. 5 is a schematic representation indicating that FIG. 5A, FIG. 5B, and FIG. 5C are enlarged views that should be aligned as shown to reveal a top plan view of lower portion 14 of bottle carrier packaging machine 10.

As depicted in FIG. 3A, bottle carrier loading module 18 of packaging machine 10 comprises a first suction assembly 26, a second suction assembly 28, a carrier storage assembly 30, a punching assembly 32, and a bottle carrier conveyor assembly 34.

As depicted in FIG. 3A (and shown in FIG. 4A), carrier storage assembly 30 supports a loaded plurality of folded bottle carriers 2 and dispense them one at a time to move along a portion of the first pathway 800. Carrier storage assembly 30 includes a base 62, a first square side wall 64, a second square side wall 66, and a pushing slider 68. Pushing slider 68 comprises a plate 69 and a sliding assembly 70 which is located underneath base 62. Base 62 defines a horizontal slot 72 and includes a plurality of sliding guides 74. Horizontal slot 72 formed in base 62 is placed along with the plurality of sliding guides 74. Slot 72 is aligned with the Y-axis. Pushing slider 68 moves between a first end 72A of horizontal slot 72 and a second end 72B of horizontal slot 72. First square side wall 64 is fixedly attached to base 62. Second square side wall 66 is fixedly attached to base 62 and supported by a plurality of side supporters 76. Base 62 is indirectly coupled with frame 11 of machine 10.

As depicted in FIG. 3A and FIG. 4A, sliding assembly 70 is disposed beneath base plate 62. Slider base 75 is generally shown as a rigid member including a slider guide 71 extending upwardly therefrom operatively connected to a sliding rail 79 fixedly connected with the bottom surface of base plate 62. Sliding guide 71 enables slider base 75 to slidably move in the Y-direction while substantially precluding movement in the direction of the X-axis and the Z-axis. Vertical pole 77 is secured to slider base 75 via a nut or a collar shown generally at 67. Vertical pole 77 extends upwardly through slot 72 formed in base 62 to connect with plate 69. A connection of plate 69 with vertical pole 77 enables plate 69 to move in the direction of the Y-axis as sliding assembly 70 is powered and moved by an actuator (not shown). Projections 63 extend inwardly from sidewall to assist with the retention of folded carriers 2 when loaded in on the carrier storage assembly 30 as will be described in greater detail below in referring to FIG. 9.

First suction assembly 26 is utilized to grasp a folded carrier from the storage assembly 30, and the first suction assembly 26 may include a plurality of first suction cups 40, a linear actuator 41, a first suction cup holder 42, a sliding glider 44 carrying an actuator 46 operatively connected to first suction cup holder 42, a pair of guide rails 38, an actuator rod 41 interposed between the pair of guide rails 38, and supported by a base plate 39.

Portions of first suction assembly 26 operate with pneumatic air lines; however, for clarity purposes, the air inlets and air outlets associated with the pneumatic lines are not shown in the figures as well as suction lines. However, one having ordinary skill in the art would easily understand and foresee the operation thereof.

Sliding glider 44 is utilized to move a folded bottle carrier along a portion of the first pathway 800 and the glider 44 defines a number of holes 50 that enable glider to slide along guide rails 38 and linear actuator 41. Sliding glider 44 travels between end walls 37. The pathway of sliding glider 44 between end walls 37 occurs in the direction of the X-axis. A first position of sliding glider 44 is depicted in FIG. 3A and a second position of sliding glider 44 is associated with the other end wall which corresponds to movement towards the right in the direction of the X-axis when viewed from above as shown in FIG. 3A.

One or more piston rods 48 is operatively connected to actuator 46 atop glider 44. Piston rods 48 are rigidly connected to first suction cup holder 42. The plurality of first suction cups 40 are fixedly attached to first suction cup holder 42. Actuator 46 effectuates linear movement of suction cups 40 between a retracted first position and an advanced second position. Suction cups move in a direction along the Y-axis. The movement of the holder 42 carrying suction cups 40 is orthogonal to the sliding movement of glider 44.

Regarding directional movement of assembly 26 and second assembly 28, first suction assembly 26 is moveable in two directions. Sliding glider 44 enables first suction assembly 26 to move in a first direction associated with the X-axis and actuator 46 enables first suction cups 40 to move in a second direction associated with the Y-axis. Second suction assembly 28 moves in a single direction. Particularly, actuator 54 enables second suction cups 56 to move in a direction associated with the Y-axis. However, in the shown embodiment, suction cups 56 are fixed with respect to the X-axis.

With continued reference to FIG. 3A, second suction assembly 28 is utilized to move the bottle carrier 2 along a portion of the first pathway 800 and the second suction assembly 28 includes an elongated actuator 54, a plurality of second suction cups 56, and a second suction cup holder 58. Actuator 54 is operatively connected to second suction cup holder 58 which is fixedly connected with the plurality of second suction cups 56. One end of elongated actuator 54 is fixedly coupled indirectly to frame 11 of packaging machine 10. Elongated actuator 54 is slidably connected to horizontal base plate 61 via one or more sliding guides 55. As will be described in greater detail below, elongated actuator 54 enables movement of second suction cups 56 between a retracted first position and an advanced second position. Movement of second suction cups 56 occurs in the direction of the X-axis between the first and second positions. Elongated actuator 54 may be pneumatically powered or electronically powered as one having ordinary skill in the art would understand and foresee. For the purposes of clarity with respect to FIG. 3A, motors and other air inlets associated with the movement of elongated actuator 54 have been removed. Second suction cups 56 are connected to an end of elongated linear actuator 54 at a suction cup holder 58. Suction cup holder 58 is rigidly connected with elongated actuator 54.

As shown in FIG. 3A and FIG. 4A, a region generally associated with the opening and locking of the bottle carrier 2 is depicted generally as carrier opening area 105. A first punching assembly 32 and a second punching assembly 94 are positioned in the carrier opening area 105. Reference will now be made to the components of each of the first punching assembly 32 and the second punching assembly 94.

Punching assembly 32 is utilized to assist in the opening and locking of the carrier 2 in its unfolded (i.e., assembled) stated and punching assembly 32 includes an actuator 78, an actuator holder 80, a punching rod 82, and a punching tip 84. Actuator 78 is fixedly attached underneath actuator holder 80. Actuator holder 80 is indirectly coupled with frame 11 of packaging machine 10. Punching tip 84 is moveable in the direction of the X-axis between a retracted first position and an advanced second position. The movement of punching tip 84 from the retracted first position to the advanced second position is associated with directional movement along the X-axis and moving towards the left when viewed from above as shown in FIG. 3A which will be described in greater detail below with respect to the operation of forming bottle carrier 2.

Second punching assembly 94 is utilized to assist in locking the carrier 2 in its unfolded (i.e., assembled) state and second punching assembly 94 includes an actuator 91, an extendable piston 93, and a tip 95 for punching the bottom of bottle carrier 2 upwardly to thereby lock the bottle carrier 2 in an open configuration. Actuator 91 receives piston 93 therein and enables piston 93 to extend between a retracted first position and an advanced second position. One end of actuator 91 is connected with an L-shaped bracket 94A via a nut 94B. L-shaped bracket 94A is connected with a tapered dropping guide flange 101 which assists with guiding open bottle carriers 2 when released in the assembled and open configuration and they dropped onto conveyor assembly, the operation of which will be described in greater detail below. Tapered flange 101 is indirectly coupled with frame 11 of machine 10. The movement between the retracted first position and the advanced second position of punching tip 95 occurs generally in the direction of the Z-axis as depicted in FIG. 4A. Some implementations may provide a slight tilt or angled movement of tip 95 from the retracted first position to the advanced second position and in other embodiments, movement of tip 94 may be directly vertical.

As depicted in FIG. 3B, first punch assembly 32 is positioned above one of the sections of conveyor belt 88. In one particular embodiment, actuator holder 80 is positioned above a second conveyor section 88B of conveyor belt 88

(the conveyor belt and its two sections will be described in more detail below). Accordingly, actuator holder 80 is offset entirely to one side of divider plate 96. While actuator holder 80 is shown as fixed along supportive member 98, other implementations are contemplated that would enable first punch assembly 32 to be moveable transversely along the length of a supportive member as one having ordinary skill in the art would understand and foresee. Supportive member 98 is indirectly coupled with frame 11.

As depicted in FIGS. 3A-3C and depicted in FIG. 4A and FIG. 4B, bottle carrier conveyor assembly 34 is positioned downstream from second suction assembly 28 and is utilized to move carriers downstream along the first pathway 800 and includes at least one conveyor belt 88 (See FIG. 4A and FIG. 4B), a plurality of rollers 90 located underneath conveyor belt 88, a main drive roller 92 (See FIG. 4B) located underneath conveyor belt 88, and a motor 93 to move conveyor belt 88. Conveyor assembly 34 further includes a carrier path divider 96, a plurality of horizontal supporting bars 81 to hold carrier path divider 96, a set of side guides 97 to guide bottle carriers 2 and prevent them from falling off from conveyor belt 88, and a plurality of side guide holding components 99. Side guide holding components 99 comprise a base 99B, a retractable arm 99A, and an L-shaped bracket 99C. Base 99B of side guide holding components 99 are fixedly connected on L-shaped bracket 99C. One end of L-shaped bracket 99C is connected with one of frame members of bottle carrier packaging machine 10. Retractable arm 99A is freely inserted through a hole defined in base 99B. One end of retractable arm 99A is fixedly attached with side guide 97. Since the length of retractable arm 99A is freely adjustable through the hole defined in base 99B, the width of bottle carrier path defined by the distance between two side guides 97 can be adjusted in accordance with the size of bottle carrier 2.

Regarding directional movement conveyor belt 88, the belt 88 moves in a direction associated with the X-axis. The belt 88 rotates as will be described in greater detail below to move carriers downstream.

As depicted in FIG. 3A and FIG. 3B, adjusting components 99 are attached to side guide 97. One set of adjusting components 99 are connected to side guide 97 adjacent its upstream end and another set of adjusting components 99 are attached to side guide 97 adjacent its downstream end. The adjusting components at the upstream and downstream ends of side guide 97 cooperate to selectively define a slight tapering angle of side plate 97 when viewed from above to thereby narrow the conveyor sections 88A, 88B with respect to the Y-axis. This enables bottle carriers moving downstream atop conveyor belt 88 to be guided and aligned in a more square position for later placement into the large case 4 which will be described in more detail below.

Furthermore, the first and second conveyor sections 88A, 88B, respectively, are sometimes referred to and define first and second conveying pathways. The first and second conveying pathways defined by sections 88A, 88B are offset relative to one another. Particularly, they are offset parallel on opposite sides of divider 96. As will be described in greater detail below, a computer having conveying logic selectively controls the cadence of depositing carriers 2 along the respective offset conveying pathways.

As depicted in FIG. 3B and FIG. 4B, motor 93 is operatively connected to a drive wheel 92 configured to rotate to thereby move conveyor belt 88 over and around idle rollers 90A-90E and around first end 96A and second end 96B. Movement of the upwardly facing top surface of conveyor belt 88 occurs in the downstream direction which is associated with the direction of the X-axis. The end 96B is positioned upstream from the dropping module 23.

As depicted in FIG. 3C, dropping module 23 includes a set of side guides 106, a set of adjustable side guide supporters 109, and at least one back stop 110. The adjustable side guide supporters 109 may be selectively set by an operator to vary the transverse distance associated with the Y-axis that defines carrier loading area or zone which is shown generally as 107. Side guide supporter 109 includes an L-shaped holder 109B and a retractable arm 109A. One end of L-shaped holder 109B is fixedly attached with a portion of the frame of packaging machine 10. The other end of L-shaped holder 109B is movably connected with retractable arm 109A. One end of retractable arm 109A is fixedly connected with side guide 106. Since retractable arm 109A is movably connected with L-shaped holder 109B, the width defined by the distance between the two side guides 106 can be adjusted in accordance with the size of bottle carrier 2 by changing the length of retractable arm 109A. Dropping module 23 further includes a first drop-flap 112, a second drop-flap 113, an actuator 114, a first connecting rod 116, and a second connecting rod 117.

As depicted in FIG. 3C and FIG. 8, dropping module 23 further includes an actuator 114, a piston rod 118, an end connector 127, a coupler 122, a rod 120, including a connector 128 at one end and a connector 129 at the other end of rod 120, and a coupler 123. Actuator 114 receives piston rod 118 therein and piston rod 118 is moveable between a first advanced position and a second retracted position. End connector 127 at the end of piston rod 118 moves therewith. A pin 124 is freely connected with end connector 127 and extends in a direction of the X-axis. Coupler 122 couples end connector 127 with connector 128 via a free connection with pin 124. The free connection of pin 124 extending through connector 127, coupler 122 and connector 128 enables rotation about axis 108A when actuator 114 is actuated. Coupler 122 is fixedly attached with rod 116 such that movement of piston rod 118 when actuator 114 is actuated rotates rod 116 about axis 108A. Plate 112 is fixedly connected with rod 116 and moves therewith when actuator 114 actuates piston 118 from the first advance position and draws it inward towards the retracted second position. Plate 112 is rotatably moveable from a generally horizontal first position to a generally vertical second position thereby defining an opening in the loading region 111 of dropping module 23 which will effectively enable loaded bottle carriers 2 to pass therethrough, the operation of which will be described in greater detail below. Connector 128 is rigidly connected with rod 120 extending in the direction of the Y-axis to a rigid connection with connector 129. Connector 129 is freely connected via pin 125 with coupler 123. Pin 125 is freely connected with one end of coupler 123 and coupler 123 is fixedly connected to rod 117 at an opposite end. The fixed connection of coupler 123 with rod 117 enables rotational movement of rod 117 and coupler 123 collectively when actuator 114 moves piston rod 118 to thereby indirectly move rod 120. Second plate 113 is fixed connected with rod 117 and is moveable in a similar fashion to that of first plate 112. Plate 113 moves between a generally horizontal first position and a generally horizontal second position. When second plate 113 moves to the generally vertical second position, the opening in loading region 111 allows bottle carriers to pass therethrough.

As depicted in FIG. 4A, sliding assembly 70 of pushing slider 68 comprises a vertical pole 77, a slider base 75, a sliding guide 71 and a rail 79. One end of vertical pole 77 is connected with plate 69, and the other end of vertical pole 77 is connected with one end of slider base 75 by a nut 67. The other end of slider base 75 is operatively connected with rail 79 by sliding guide 71. Siding guide 71 is movable along on rail 79.

With continued reference to FIG. 4A and FIG. 4B, conveyor belt 88 is circulated around a first roller 90A, a second roller 90B, a third roller 90C, a fourth roller 90D, a fifth roller 90E, and drive roll 92. Drive roll 92 is directly connected with motor 93. Conveyor belt 88 also passes over a front conveyor edge 96A and a rear conveyor edge 96B. In one embodiment, conveyor belt 88 passes underneath drive roll 92 and rollers 90A, 90C and passes over rollers 90B, 90D, and 90E. However, in another embodiment, the configuration of the conveyor belt path may be different. Rotational movement of drive roll 92 moves conveyor belt 88.

As depicted in FIG. 4B, a preguide 103 is indirectly coupled to frame 11 and positioned above the upwardly facing top surface of conveyor belt 88 and is preferably centered between divider plate 96 and side guide 97 when viewed from above and the two preguides respectively located above sections 88A and 88B of conveyor belt 88. Preguide 103 assists with the alignment of unfolded and locked bottle carriers 2 for aligned movement into dropping module 23 as will be described in greater detail below.

With continued reference to FIG. 4B, dropping module 23 includes vertical pushing actuator 410 and a piston rod 413 received therein. In one particular embodiment, actuator 410 may be positioned between guide rails 412. A base plate 416 supports actuator 410 between secondary supports 418 which are directly coupled with frame 11. Piston rod 413 extends through base plate 416 and is rigidly connected with a pushing plate or plunger 414. Additionally, a blocking plate 420 is rigidly secured to plunger 414. Particularly, plunger 414 includes an upper plate 421 and a pair of lower alignment guiding blocks 422. The guide rails 412 directly connect with upper plate 421 and piston rod 413 directly connects with upper plate 421. Thus, the rigid connection of blocking plate 420 with upper plate 421 of plunger 414 enables downward vertical movement of blocking plate 420 when piston rod 413 is extended from its first retracted position to its second advanced position in the direction of the Z-axis. When plate 420 is in its most downward position, the vertical face of blocking plate 420 interrupts the bottle carrier 2 pathway at its upper end and interrupts the large case 4 at its lower end. Plate 420 is enabled to extend through the opening associated with loading zone 107 when plates 112, 113 are in their dropped positions.

With continued reference to FIG. 4B, dropping module 23 further includes a set of guide plates 425 indirectly coupled with frame 11. In one particular embodiment, a first set of guide plates 425A are parallel and aligned in the direction of the X-axis and a second set of guide plates 425B are parallel and aligned in the direction of the Y-axis. Each of the guide plates 425A includes a generally vertical upper section and an inwardly tapering lower section. Collectively, the guide plates 425 define a four-sided bottle carrier chute 426 to effectuate downward movement of bottle carriers 2 when they are being loaded into the large case 4 as will be described in greater detail below. Additionally, the lowered tapered sections of the guide plates 425 assist the opening of large case 4 when it is being raised during the loading or combining process. Additionally, guide plates 425 are fixed in place relative to frame 11 such that they do not move with respect to the X-axis, Y-axis, and Z-axis; however, it is entirely possible that other embodiments of the present disclosure may provide a machine 10 with guide plates 425 forming chute 426 that may be adjustable to vary the size of the chute 426.

As depicted in FIG. 5A, lower portion 14 includes a large case loading module 20A comprising a set of moveable side assemblies 202. Each side assembly 202 includes a conveyor belt 224 which wraps around pulleys 220, 222 and includes a side guide plate 232. Each side assembly 202 independently moves along threaded rods 210 which are operatively connected to a rotatable handle 212 thereby adjusts the side assembly 202 in the direction of the X-axis. Side assembly 202 further includes a set of large case pressing carriage trolleys 206 for pressing against folded large cases 4. Base 204 is defined that large case 4 may rest atop. First pulley 220 is located at one end of movable side 202. Second pulley 222 is located at the end of movable side 202. Particularly, only first pulley 220 is connected with actuator 216. Second pulley 222 is not directly connected with actuator 216. Conveyor belt 224 rotatably encircles around first pulley 220 and second pulley 222. One end of side stopper 230 is fixedly connected with one of horizontal rails 228.

Each side assembly 202 has a pushing carriage trolley 206 operatively connected thereto. Each side assembly 202 defines a rail 209 upon which the carriage trolley 206 travels. The carriage trolley 206 carries a pressing component 207 which is capable of being pivoted about a vertical axis to flexibly permit large folded cases to be loaded above each side assembly 202. A limiter 211 prevents rotation of the pressing component 207 in the opposite direction of the travel of the conveyor belt 224. Additionally, carriage 206 may include handles 213 to enable an operator to push carriage 206 along rails 209. Other implementations may provide a motor to drive carriage 206 as one having ordinary skill in the art would understand and foresee. Pressing component 207 is moveable between a pushing configuration and a loading configuration. The pushing configuration is depicted in FIG. 5A and is shown as a solid line version of pressing component 207 and the loading configuration is shown in dashed lines associated with pressing component 207. In the pressing configuration, component 207 spans across and over the top of side plate 232 and in the loading configuration. A portion of component 207, when viewed from above, is approximately parallel with side wall 232 in the loading configuration.

With continued reference to FIG. 5A, loading module 20A further includes side stoppers or side rails 230. Guide rails 228 extend between side rails 230 parallel with the X-axis. Guide rails 228 extend through each side assembly 208 to support and guide each side assembly 202 as the side assemblies 202 are maneuvered in the X-axis by threaded rod 210 cranked by handle 212. Side stoppers 230 are also connected with a vertical adjustment assembly 235 which when actuated via a crank handle 236 (FIG. 1), or other means, alters the vertical height in the Z-axis of loading module 20A. Each side assembly 202 includes a motor 216 that independently drives conveyor belt 224 on each respective side assembly. Preferably, computer logic 500 operatively controls motors 216 to insure that conveyor belts 224 rotate at the same rate to keep folded large cases 4 relatively square as they are loaded and move along the large case pathway. Additionally, a width 237 as associated with the distance between side walls 232 respectively on each of the side assemblies 202. Width 237 is adjustable as threaded rods 210 are rotated via handle 212 to respectively move each side assembly 202. It is noteworthy that threaded rods 210 move in unison via a connecting belt operatively extending between the rods and operatively connected to handle 212 such that a single rotation of handle 212 moves both threaded rods 210 associated with one side assembly 202.

With continued reference to FIG. 5A together with FIG. 1, a pair of conveyor brakes 217 are provided respectively beneath sides 202. A pair of conveyor brakes 217 are configured to halt or slow the speed of conveyor belts 224 rotating around the pulleys 220. In one particular embodiment, the pair of conveyor breaks 217 may be a pneumatic piston; however, other means for breaking conveyor belts 224 are contemplated.

A pair of lower stops 218 may be positioned adjacent the most advanced end of conveyor belt 224. The pair of stops 218 are configured to retain empty folded large cases 4 when they are loaded on module 20A. Additionally, an upper stop 219 may be positioned vertically above lower stops 218 to assist with holding large cases in a folded and stacked manner on module 20A. As will be described in greater detail below, the case section assembly 240 will be utilized to remove one empty folded case at a time to overcome the stopping force of the pair of lower stops 218 and the upper stops 219.

As depicted in FIG. 5B, a large case unfolding module 20B includes an actuator 250 indirectly coupled to frame 11 at a fixed end and operatively connected to a carriage assembly 256 at the other end. Carriage assembly 256 includes sliding guide blocks 258 configured to slide along guide rails 261 rigidly secured to the frame 11. Carriage assembly 256 carries the large case suction assembly 240 and carries the unfolding assembly 260. Large case suction assembly 240 includes an actuator 248, a plate 238, and a suction cup holding plate 244 carrying a plurality of suction cups 242. Additionally, plate 244 may include a secondary plate 245 having adjustable legs 249A, 249B. Legs 249A, 249B may be connected at a pin joint 249 and adjustable suction cups may be operatively connected to adjustment legs via pin joints. A piston rod 246 is received within actuator 248 and is rigidly secured to plate 244. Suction cups 242 are configured to move between a first retracted position and a second advanced position in the direction of the Y-axis.

Figure 6:
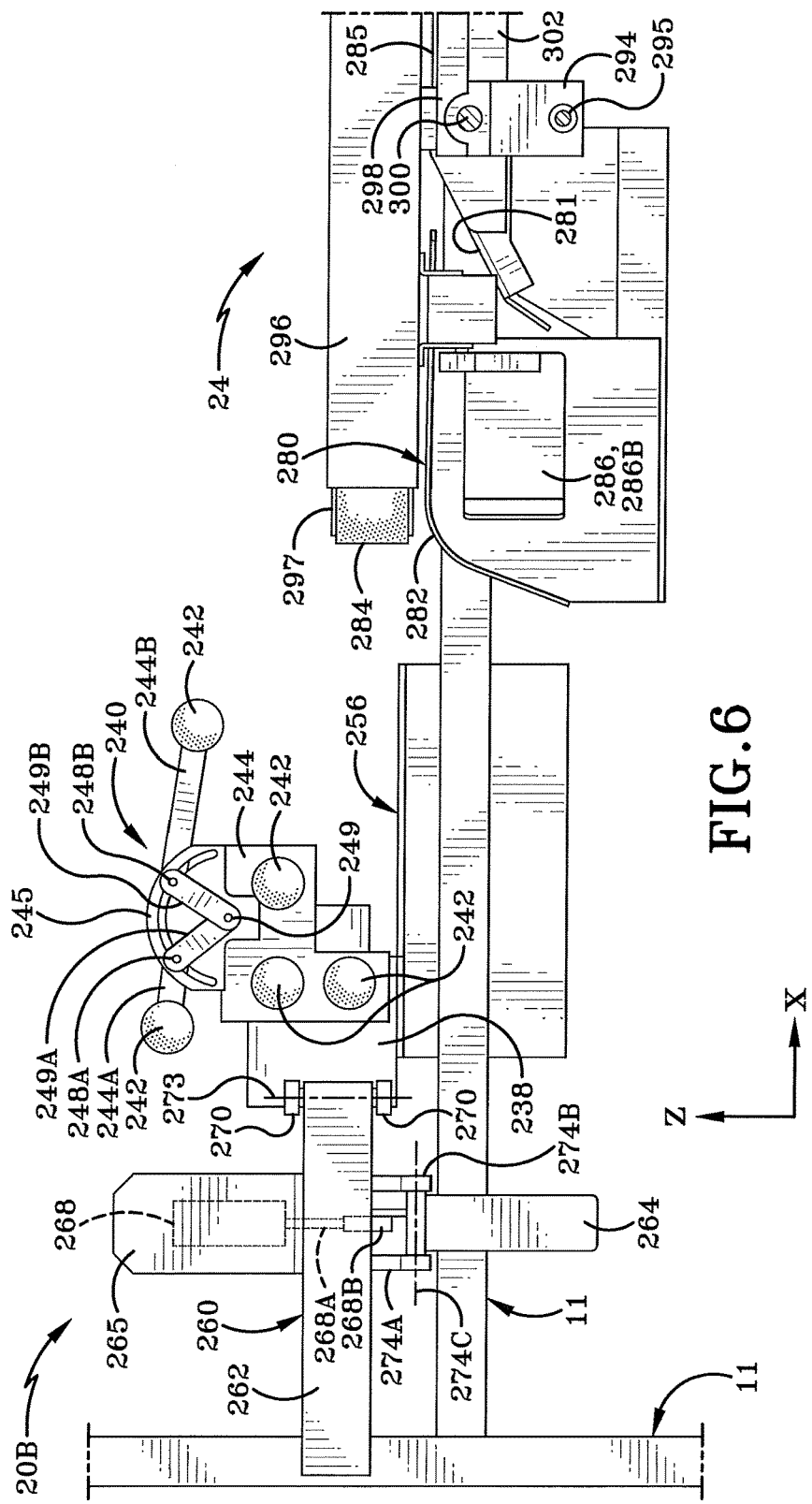
FIG. 6 depicts a partial side elevation view taken along line 6-6 in FIG. 5B and FIG. 5C.

Unfolding assembly 260 includes an actuator 266 secured to a frame portion of carriage 256 via bracket 255. Extendable end of actuator 266 is freely and rotatably connected via bracket 271 to a pushing plate 262. Pushing plate 262 is rotatably moveable about a vertically extending axis 273 located at a pin joint 254E. Pin joint 254E connects an end of pushing plate 262 via an eyelet rigidly secured to plate 238. Folding assembly 260 further includes an actuator 268 operatively connected to plate 264 (FIG. 6). Actuator 268 is configured to rotate plate 264 about an axis parallel to the X-axis. Actuator 268 is supported at one end via plate 264 and the piston end of actuator 268 is rotatably secured to a backside of plate 264.

Actuator 250 is connected below carriage assembly 256 at a pivot connection 254B with an end 253. The piston 252 associated with actuator 250 is moveable between a first retracted position and a second advanced position. Additional pin/pivot connection forming pivot points are shown generally as 254A, 254C, and 254D.

As depicted in FIG. 6 (a front side view of large case unfolding module 20B), first and second reconfigurable suction cup holding arms are connected with a first slidable arm and a second slidable arm which are pivotally connected with around point. First and second reconfigurable suction cup holding arms slidably moves along a circular channel formed in a plate 245 so that the lengths of first and second reconfigurable suction cup holding arms can be changed. Plate 245 is fixedly attached to suction cup holding plate 244. One end of extendable rod 246 is connected with suction cup holding plate 244. The other end of suction cup extendable rod 246 is slidably engaged with actuator 248 so that forward or backward movements of actuator 248 enables suction cup extendable piston rod 246 to move forwardly or backwardly. Actuator 248 is attached on base plate 256. Base plate 256 is further attached on a sliding block 258. Sliding block 258 is slidably engaged on a set of sliding guide rails 257 and are coupled generally to frame 11 of bottle carrier packaging machine 10. The other end of horizontal actuator 250 is configured to transversely receive extendable pushing arm 252. One end of transversely extendable pushing arm 252 is connected with connector 253 which is fixedly connected with base plate 256 by a pin joint 254B.

Figure 7:
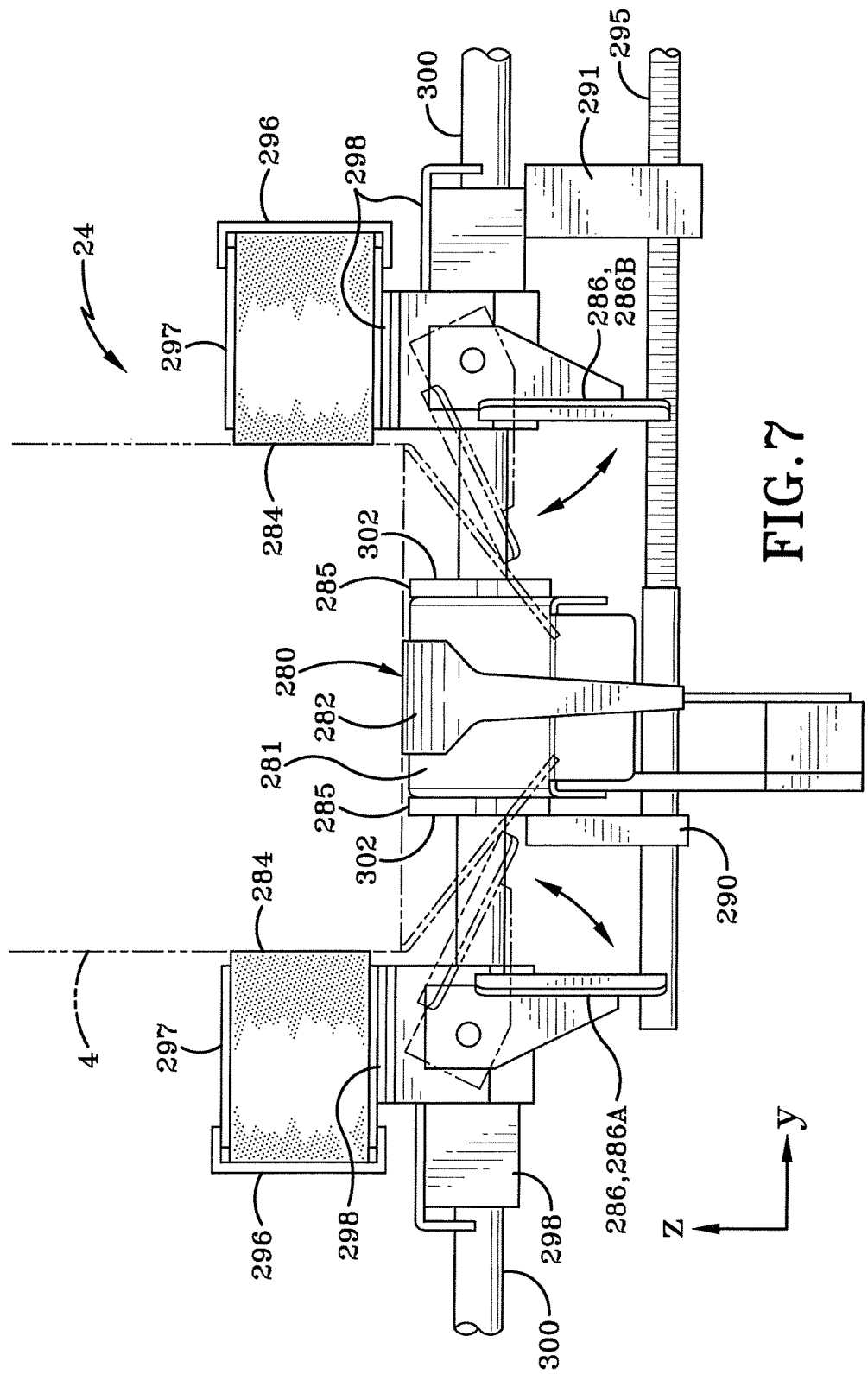
FIG. 7 depicts a transversely extending elevational cross section view taken along line 7-7 in FIG. 5B.

As depicted in FIG. 5B, FIG. 6, and FIG. 7, the flap folding assembly 280 includes a first rotatable plate 286A, a second rotatable plate 286B, a leading end flap folding fixture 282, and side flat folding fixtures 281 positioned downstream from folding plates 286A, 286B. Folding plate 286A is rotatable about an axis extending in the direction of the X-axis and pivotable between a first lowered position and a second raised position. When in the second raised position, the folding plate 286A is slightly above the bottom edge of side flap fixture 281. Fixtures 281 and 282 are indirectly coupled to frame 11. As will be described in greater detail below with respect to the operation, the leading end flap of large case 4 is folded upwardly by fixture 282 and the side flaps of large case 4 are folded upwardly by side fixtures 281. As discussed previously, the trailing edge flap of large case 4 will have already been folded upwardly via plate 264. Folding assembly 280 further defines a case moving surface 285 along which the downwardly facing bottom surfaces of side flaps large case 406 move along when driven by the conveyor assembly which will be described in greater detail below. Additionally, some implementations of the present disclosure provide an adjustable mechanism to enable one side carrying moveable plate 286B to move along a threaded rod via an adjustment block 291 which enables assembly 280 to vary in width to accommodate large cases (such as case 4) having different dimensions as one having ordinary skill in the art would clearly understand and foresee.

A top plan view of large case conveying module 24 is depicted in FIG. 5B and FIG. 5C. Large case conveying module 24 comprises a set of conveyor belts 284, first pulleys 288A, second pulleys 288B, a set of conveyor belt housings 297, and a set of side walls 296. Large case conveying module 24 further comprises a set of conveyor belt actuators 292, a set of middle rails 302 defining surface 285, a set of horizontal rods 300, a set of conveyor path width adjustable rods 295, and a handle 293 connecting operatively connected the rods via a belt (not shown). Each conveyor belt actuator 292 is placed in each conveyor belt housing 297. Each conveyor belt 284 encircles the first pulley 288A, conveyor belt actuator 292, and second pulley 288B. Conveyor belt housing 297 is fixedly connected with side wall 296 to protect conveyor belt 284. The bottom of conveyor belt housing 297 is fixedly attached with conveyor belt housing base 298 which is indirectly coupled to frame 11 through rods 300. The set of middle rails 302 are located between the set of conveyor belt housings 297. One end of vertical rods 300 are fixedly connected with frame 11.

As depicted in FIG. 7, the set of rods 300 are inserted through the set of bases 298 and the set of middle rails 302. Rod 295 is rotatably supported by plate 290. Rod 295 is also freely supported with a threaded adjustment block 291. Rod 295 may also be operatively connected to housings 297 in order to change the path width of large case 4 as indicated in FIG. 5C.

A top plan view of receiving module 25 is depicted in FIG. 5C. Receiving module 25 comprises a first side wall 314, a second side wall 316, a plurality of rollers 312, a set of first side adjustable supports 330, a set of second side adjustable supports 332, a large case lifting device 320, and a large case stopping assembly 324. Collectively, these elements define a large case loading area/zone 317. First side adjustable supports 330 comprises first L-shaped side guide holder 330A and a first side guide arm 330B. Second side adjustable support 332 comprises a second L-shaped side guide holder 332A and a second side guide arm 332B. One end of first L-shaped side guide holder 330A is indirectly coupled with frame 11 via C-shaped roller supports 331. First side guide arm 330B is inserted through the first L-shaped side guide holder 330A. The first side guide arm 330B is fixedly connected with first side wall 314.

Second L-shaped side guide holder 332A is indirectly coupled with frame 11. Second side guide arm 332B is freely inserted through the other end of second L-shaped side guide holder 332A. The other end of second side guide arm 332B is fixedly connected with second side wall 316. Since the set of second side guides 332 are freely inserted and held by second L-shaped side guide holder 332A, the width between first side wall 314 and second side wall 316 can be adjusted by changing the lengths of second side guide arms 332B in the direction of E. As depicted in FIG. 8, large case stopper 324 comprises an actuator 323, an L-shaped bracket 333, a set of arms 321, and a stopping plate 322. Actuator 323 is fixedly attached on L-shaped bracket 333. One end of arm 321 is received in actuator 323. The other end of arm 321 is fixedly connected with stopping plate 322. In one embodiment, large case stopper 324 is fixedly attached on first side wall 314. In another embodiment, large case stopper 324 may fixedly be attached on second side wall 316. Large case pushing device 320 comprises a set of pushing bars 325, a pushing body 326, a vertical pushing arm 328, an actuator 329, and actuator holder 327. Actuator 329 receives in one end of vertical pushing arm 328. The other end of pushing arm 328 is connected with one end of pushing body 326. The other end of pushing body 326 is connected with the set of pushing bars 325. Large case pushing device 320 located underneath the plurality of rollers 320 may push large case 4 upwardly to safely receive bottle carriers 2 from dropping module 23.

In accordance with an aspect of the present disclosure, packaging machine 10 utilizes upper portion 12 to form a bottle carrier 2 moving along the first pathway 800 and a lower portion 12 to form a larger case 4 wherein a set of carriers 2 are placed into the larger case 4 to create an assembled product (FIG. 2) of a large case containing unfolded and empty bottle carriers 2 which may be carried downstream via discharging portion 16 to be later filled with bottles. The output assembly of large case 4 having empty carriers 2 placed therein provides an improvement over known assembly methods which first place bottled into carriers, then place the loaded/filled carriers into a larger case. The packaging machine 10 of the present disclosure enables the empty carriers to be first placed into the case, then an operator can load bottled into the empty slots 3 when empty carriers 2 are already placed within larger case 4. This effectively eliminates a step from the assembly process.

Figure 9:
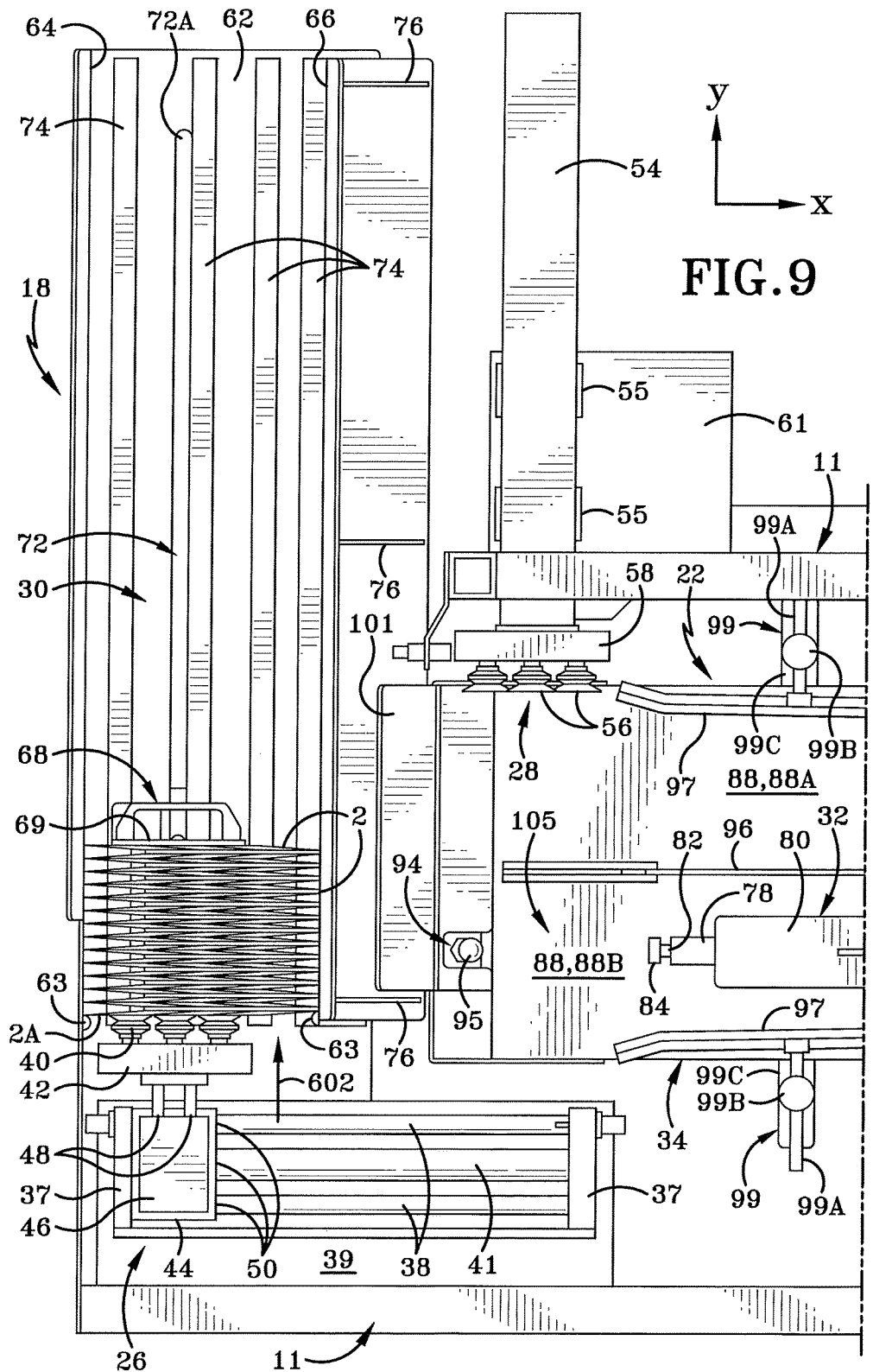
FIG. 9 depicts an operational top plan view similar to that of FIG. 3A depicting a portion of the bottle carrier unfolding process.

In operation and with reference FIG. 9, a plurality of empty and folded carriers 2 are loaded on carriage storage assembly 30. Particularly, the folded carriers 2 may be aligned in a tandem arrangement (i.e., front-to-back) and compressed via plate 69 of slider 68. The first carrier 2A is retained in place via projection 63. In order to remove first carrier 2A from the stack of plurality of carriers, the suctions cups 40 must be advanced from their first retracted position to the advanced second position. The suction cups 40 are advanced in the direction of the Y-axis as indicated by arrow 602. When suction cups 40 contact first carrier 2A, pneumatic airlines may be activated in order to create a suction therebetween.

Figure 10:
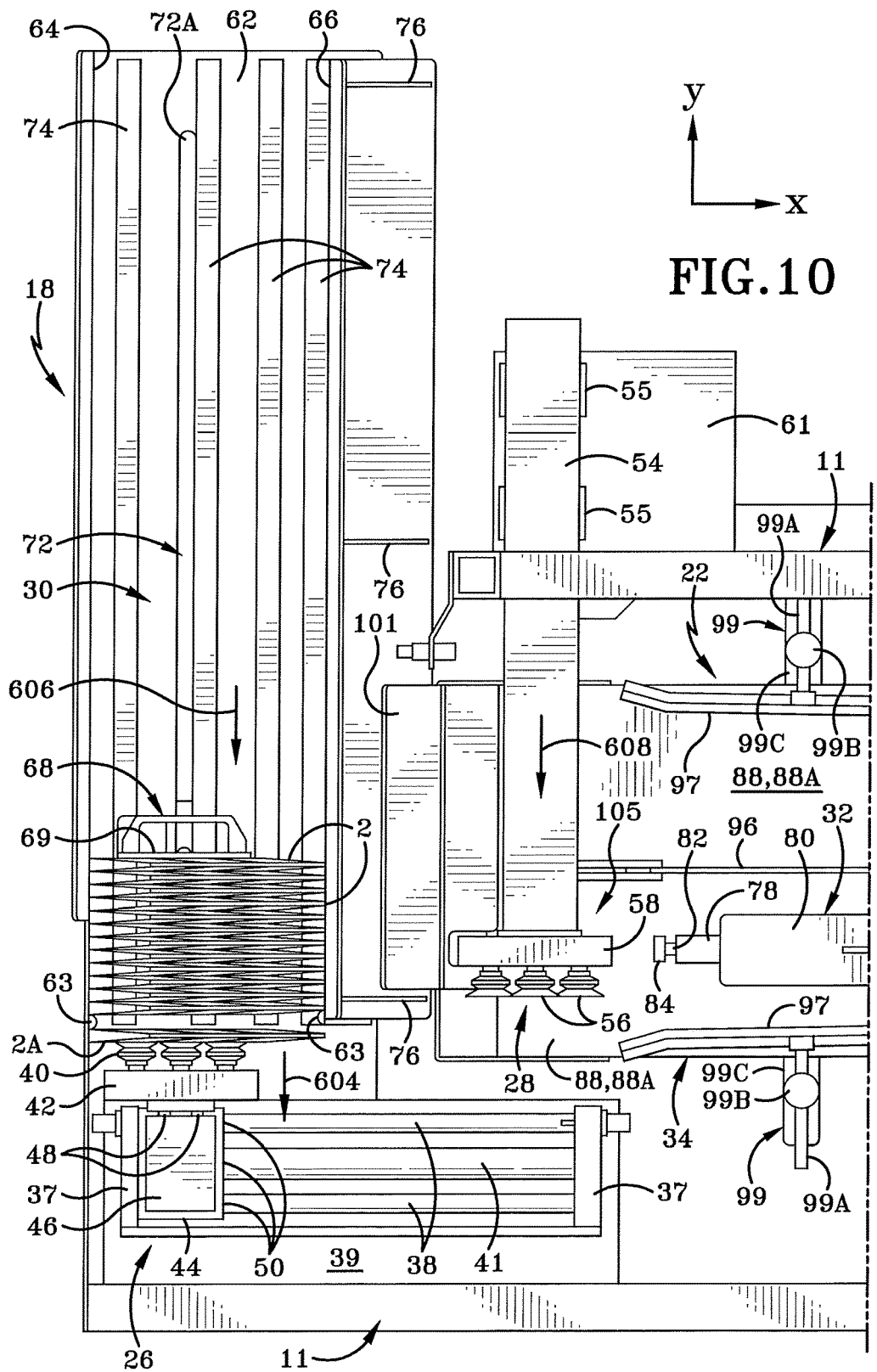
FIG. 10 depicts a top plan view similar to that of FIG. 3A depicting portions of the bottle carrier unfolding process.

As depicted in FIG. 10, the first carrier 2A may be removed from the plurality of carriers 2 stored on storage assembly 30 by the retraction of suction cups 40 from their advanced second position back to the retracted first position. During the retraction in the direction of arrow 604, which is parallel to the Y-axis, the second cups 40 releasably secure first holder 2A thereon to effectively grasp 2A from its front side. After carrier 2A has been removed from the stack, plate 69 pushes the remaining empty and folded stacked carriers 2 in the same direction as arrow 604 which is indicated by arrow 606 which is also parallel to the Y-axis.

At this point, second suction assembly and its second suction cups 56 also move from their retracted first position to their advanced second position in the direction of the Y-axis which is indicated by arrow 608.

Figure 11:
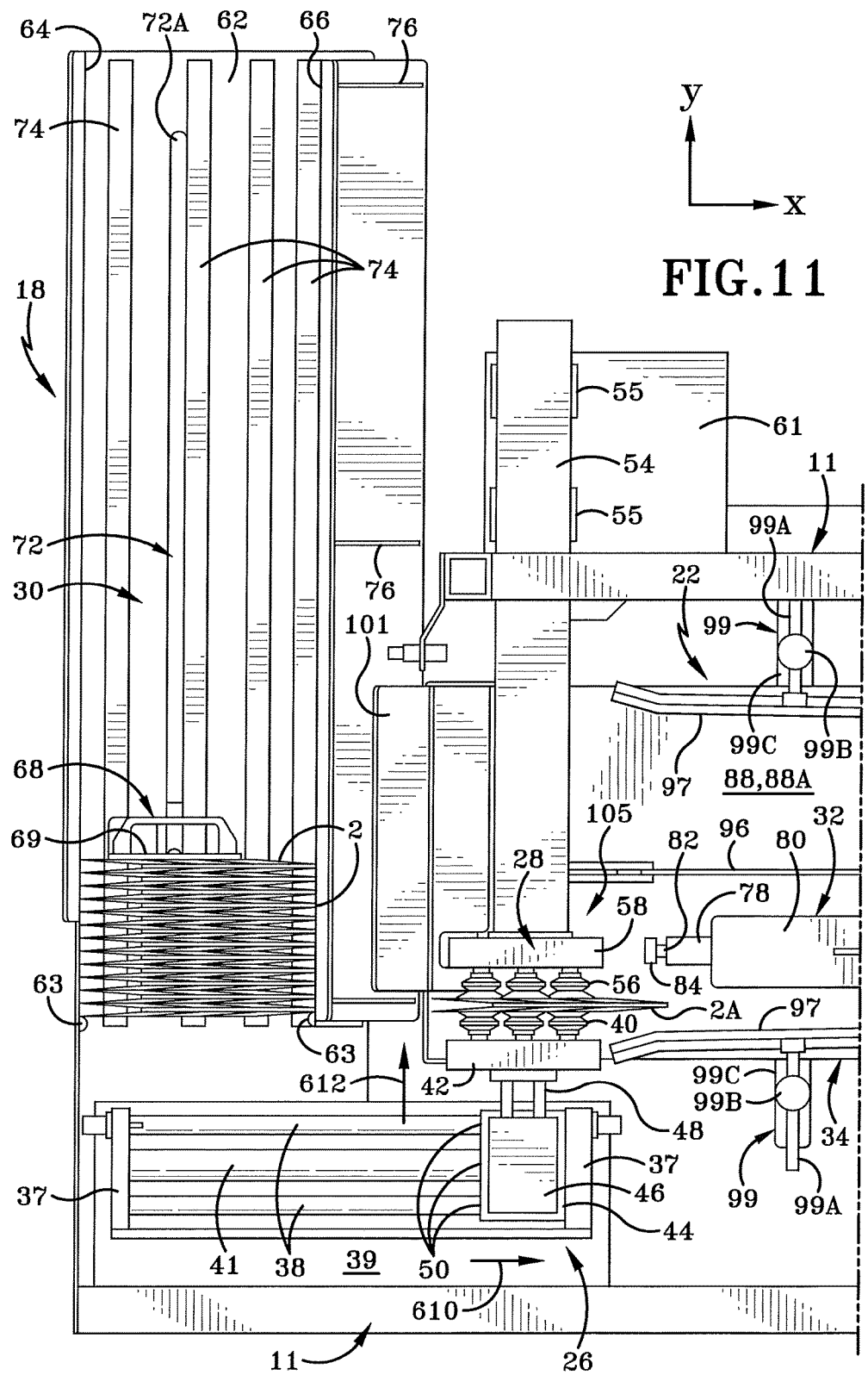
FIG. 11 depicts a top plan view similar to that of FIG. 3A depicting portions of the bottle carrier unfolding process.

As depicted in FIG. 11, portions of the first suction assembly 26 then move in the direction of the X-axis. Particularly, sliding glider 44 moves along the X-axis which is indicated by arrow 610. Sliding glider 44 moves between end walls 37 and stops at its furthest most point indicated in FIG. 11. After sliding glider 44 has reached the opposite end wall and terminated its path of travel indicated by arrow 610, actuator 46 is pneumatically actuated to push suction cups 40 from the retracted first position to the advanced second position.

With suction cups 40 in the advanced second position moved in the direction of arrow 612, the second suction cups 56 are activated to create a releasable attachment to the back side of first carrier 2A. Thus, at this time, the first carrier 2A is located generally within the opening area 105 and second suction cups 56 are attached to the backside of carrier 2A and suction cups 40 are attached to the front side of carrier 2A.

Figure 12:
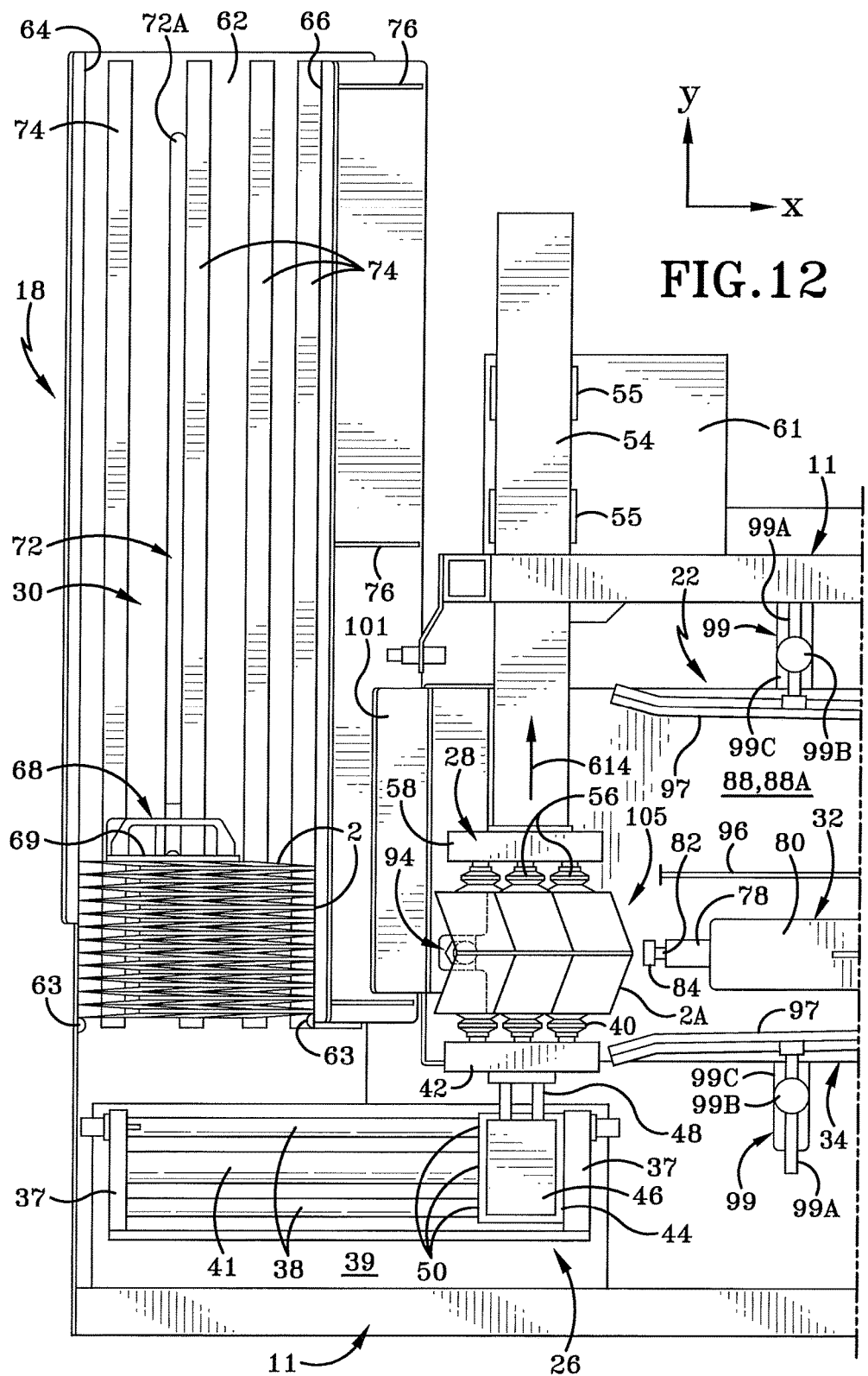
FIG. 12 depicts a top plan view similar to that of FIG. 3A depicting portions of the bottle carrier unfolding process.

As depicted in FIG. 12, with both suction cups remaining releasably affixed to respective sides of first carrier 2A, the elongated actuator is activated in order to move second set of suction cups 56 from the advanced second position back towards the retracted first position in the direction of arrow 614 which is opposite that of arrow 608 (FIG. 10).

As actuator 54 is moved in the direction of arrow 614, first carrier 2A is partially opened. The partial opening identified in FIG. 12 from the folded arrangement of first carrier 2A leaves some of the walls defining slots 3 as angled relative to the X-axis. As such, in order for carrier 2A to be "squared" the first and second punching devices must be utilized in order to contact first carrier 2A to thereby ensure carrier 2A is fully opened, unfolded, and locked in its open unfolded position.

Figure 13:
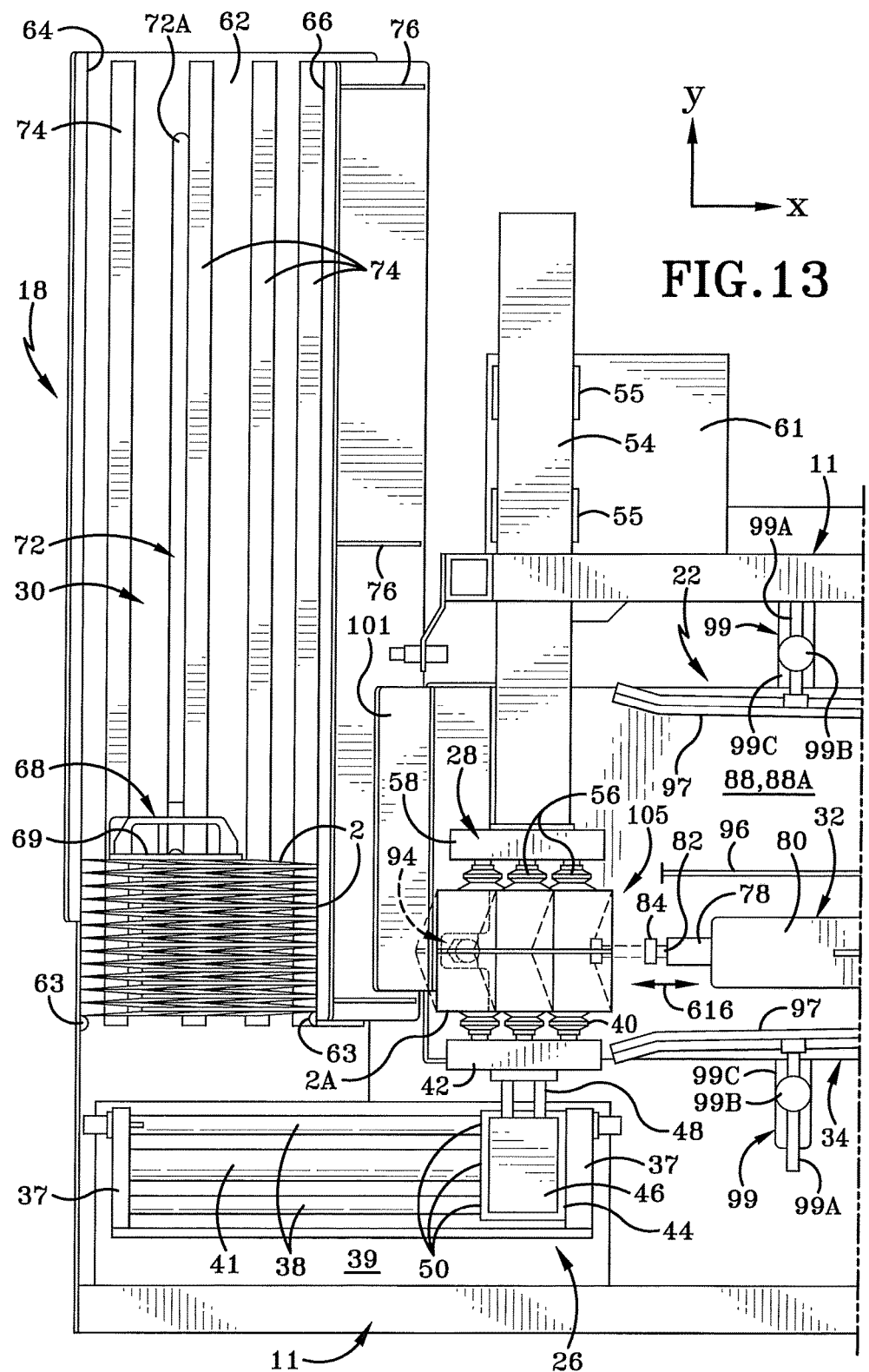
FIG. 13 depicts a top plan view similar to that of FIG. 3A depicting portions of the bottle carrier unfolding process.
Figure 14:
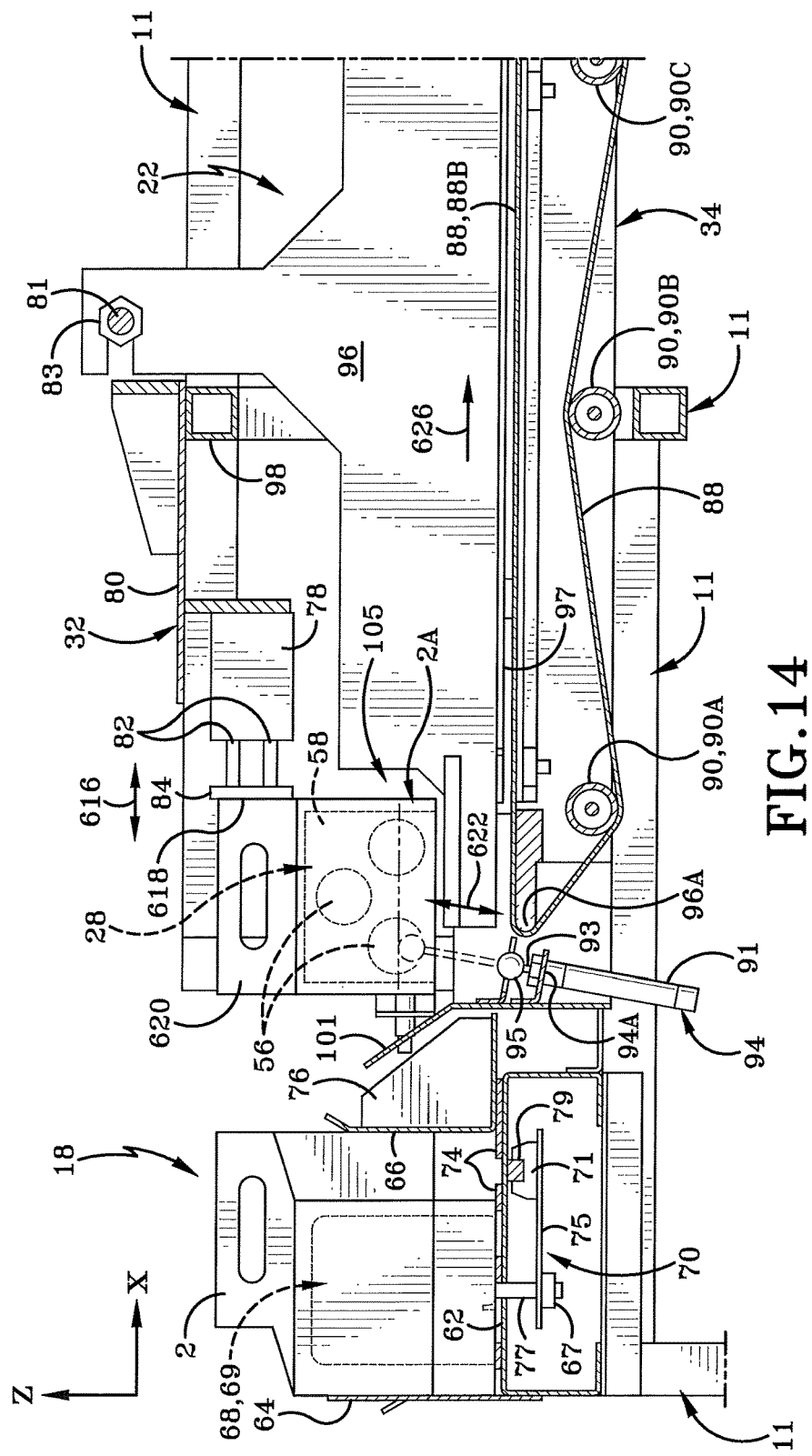
FIG. 14 depicts a longitudinal cross section view similar to that of FIG. 4A depicting portions of the bottle carrier unfolding process.

As depicted in FIG. 13 and FIG. 14, the operational movement of first punching assembly 32 and second punching assembly 94 is depicted. With carrier 2A in opening area 105, the tip 84 of first punching assembly 32 is actuated and moved from its first retracted position to its second advanced position in the direction of arrow 616 as indicated in FIG. 13 and FIG. 14. Punching tip 44 contacts the leading edge 618 of handle 620 on carrier 2A. As indicated in FIG. 13, the advanced position of tip 84 travels beyond the squared arrangement of carrier 2A. This is indicated by the dashed lines in FIG. 13 to show the flexible travel of carrier 2A. As punching tip 84 is retracted from its advanced position, the resilient material forming carrier 2A springs slowly back into position locking carrier 2A in its open, unfolded, and empty state.

Simultaneous to the movement of tip 84 on first punching assembly 32, and as indicated in FIG. 14, the tip 95 on second punching assembly 94 is advanced upwardly from its first retracted position to its advanced and raised second position. The direction of travel of tip 95 is generally associated in the vertical direction along the Z-axis, however some movement may be slightly tilted as shown in FIG. 14. The generally vertical directional movement of tip 95 is shown as arrow 622. Similar to the resilient flexing of carrier 2A depicted in FIG. 13, a similar resilient bottom flap forming a portion of carrier 2A flexes beyond its squared position to move upwardly. As tip 95 is retracted from its advanced position, the bottom resilient panel of carrier 2A flexes downward and locks the bottom panel of carrier 2A to thereby structurally form the empty and open carrier 2A, effectively thereby defining slots 3 for later filling with bottles when carrier 2A is placed within larger case 4.

Figure 15:
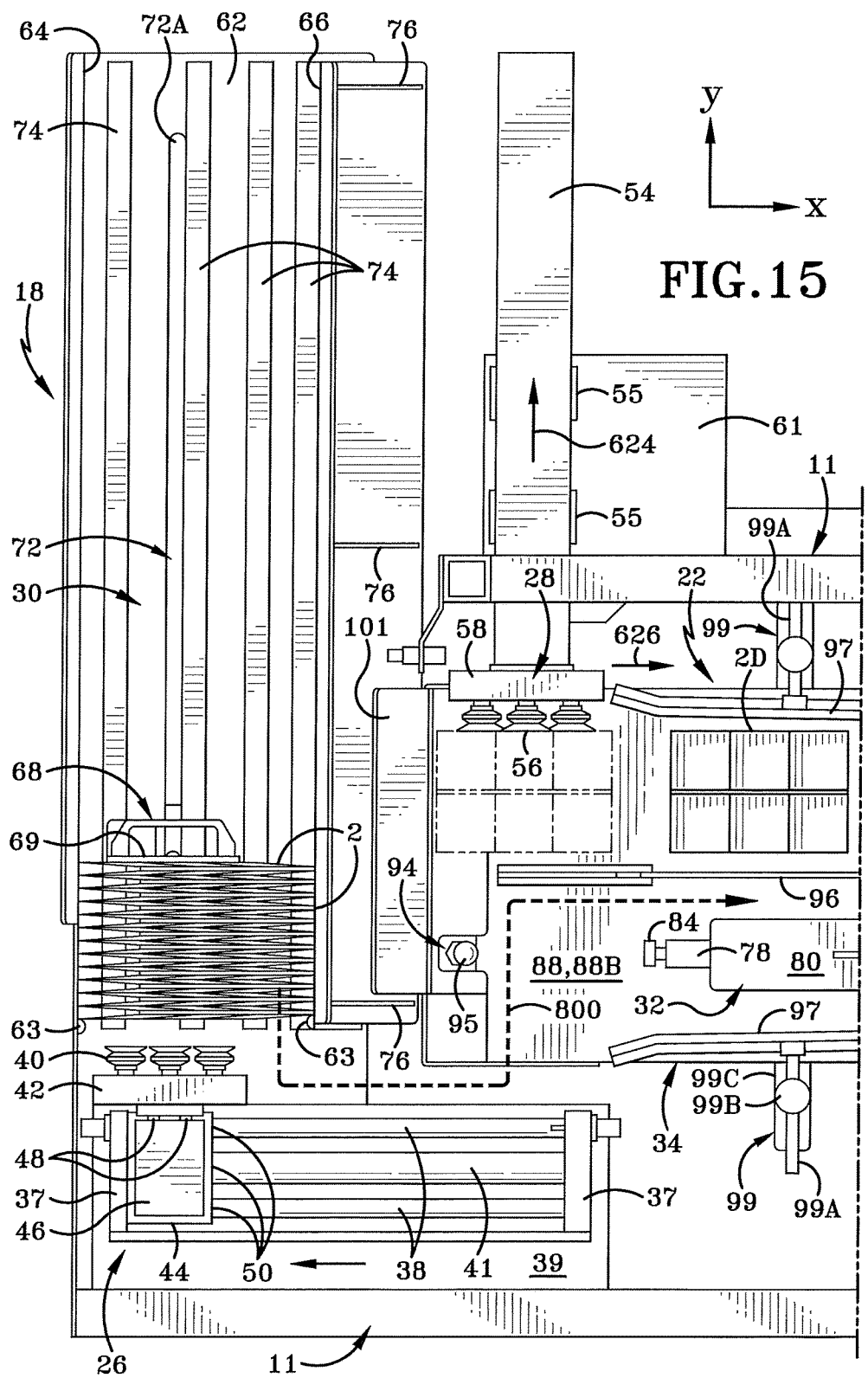
FIG. 15 depicts a top plan view similar to that of FIG. 3A depicting portions of the bottle carrier unfolding process.

As depicted in FIG. 15, a snapshot in later time is provided showing the selected movement of the fourth carrier 2D formed in a similar fashion as provided in FIG. 13 and FIG. 14. FIG. 15 represents the selective movement of one of the carriers (here fourth carrier 2D) along one of the conveyor portions 88A, 88B. Here, the fourth carrier 2D is selectively placed on first portion 88A of conveyor 88. The selective placement if carrier 2D is accomplished via computer logic 502 in computer 500 operatively connected to various motors and actuators of machine 10. Accordingly, the actuator 54 moves in the direction of arrow 624 which is substantially in the direction of the Y-axis to position the open carrier 2D that is to be placed on conveyor belt 88 above either one of portion 88A or portion 88B. When the second suction cups 56 release their releasable attachment from fourth carrier 2D, the carrier drops vertically in the direction of the Z-axis and may contact tapered dropping flange 101 as it falls under gravitational movement. The sloping angle of tapered dropping flange 101 enables a bottom edge of carrier 2D to fall and land atop conveyor belt 88 in an upright position. Conveyor belt 88 is rotating in the direction of arrow 626 to carry the upright and formed empty carrier 2D downstream along the first carrier pathway to the loading zone 107 defined by dropping module 23 of the combining assembly 21.

With continued reference to FIG. 15 and the two conveying pathways that are offset relative to each other (defined by 88A and 88B), the first empty assembled bottle carrier 2A is moved along the first conveying pathway (defined by first section 88A). Then, the second empty assembled bottle carrier 2B is moved along the second pathway (defined by first section 88B).

Figure 16:
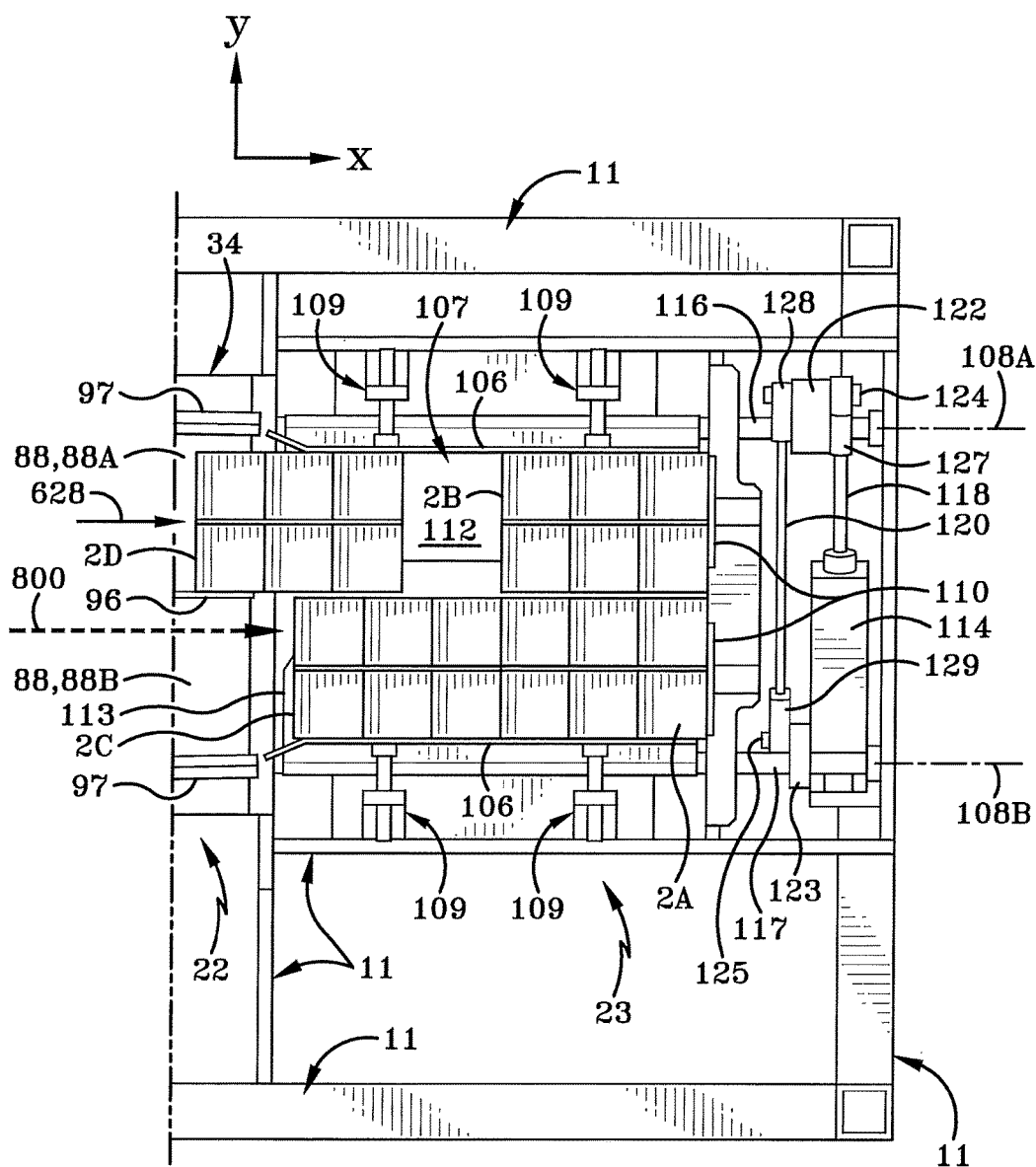
FIG. 16 depicts a top plan view similar to that of FIG. 3C depicting the loading of four unfolded, locked, and empty bottle carriers arranged in an array and queued for placement into the large case moving downstream in the lower portion.

As depicted in FIG. 16, the fourth carrier 2D continues along conveyor belt 88 and moves in the direction of arrow 628 which is in the direction of the X-axis to form an array of empty and formed carriers in the loading zone 107. Then, the first and second bottle carriers are queued in a loading zone 107 downstream from the first and second conveying pathways 88A, 88B. As the carriers 2A-2D travel along conveyor 88, the side guides 97 taper inwards towards central divider 96 to thereby effectively narrow the width of the first pathway 800 with respect to the Y-axis. The narrowing width effectuated by sidewalls 97 ensure proper alignment of carriers 2 as they move into loading zone 107 as indicated in FIG. 16. Additionally, preguide 103 assists to ensure proper vertical alignment by enabling handles 620 on each carrier 2 to pass therealong during the movement along first pathway 800. Together, sidewalls 97, sidewall 106, and upper preguide 106 ensure alignment of carriers 2 when they are in the loading zone as indicated in FIG. 16. Additionally, the loading alignment of carriers 2 in loading zone 107 and supported by dropping module 23 is assisted by lower aligning guides 422 on dropping module 23.

With continued reference to FIG. 16, it is shown that the first four carriers 2A-2D assembled define a 2×2 array in the loading zone 107. It is entirely possible that while six pack carriers are identified throughout this specification, other sized carries having a number of different empty slots 3 are entirely possible. For example, it is common for bottle carriers to be "four packs" which would include four empty slots 3. In such a scenario, a 2×3 array would be formed above loading zone 107. Furthermore, the effective area of one carrier is approximately one quarter that of the area when viewed from above of larger case 4. Thus, four carriers fit within one larger case 4.

Reference will now be made to the operation of components in the lower portion 14. However, it is to be clearly understood that the components referred to above in FIG. 9-FIG. 16 occur operationally at the same time as the movement of lower portion 14 components which are described in greater detail below. Thus, the entire packaging machine 10 cooperates to effectively have a first pathway 800 of bottle carriers 2 forming at the upper portion 12 while larger cases 4 are formed moving along second or lower pathway 900 simultaneous to that of the operation above it.

Figure 17:
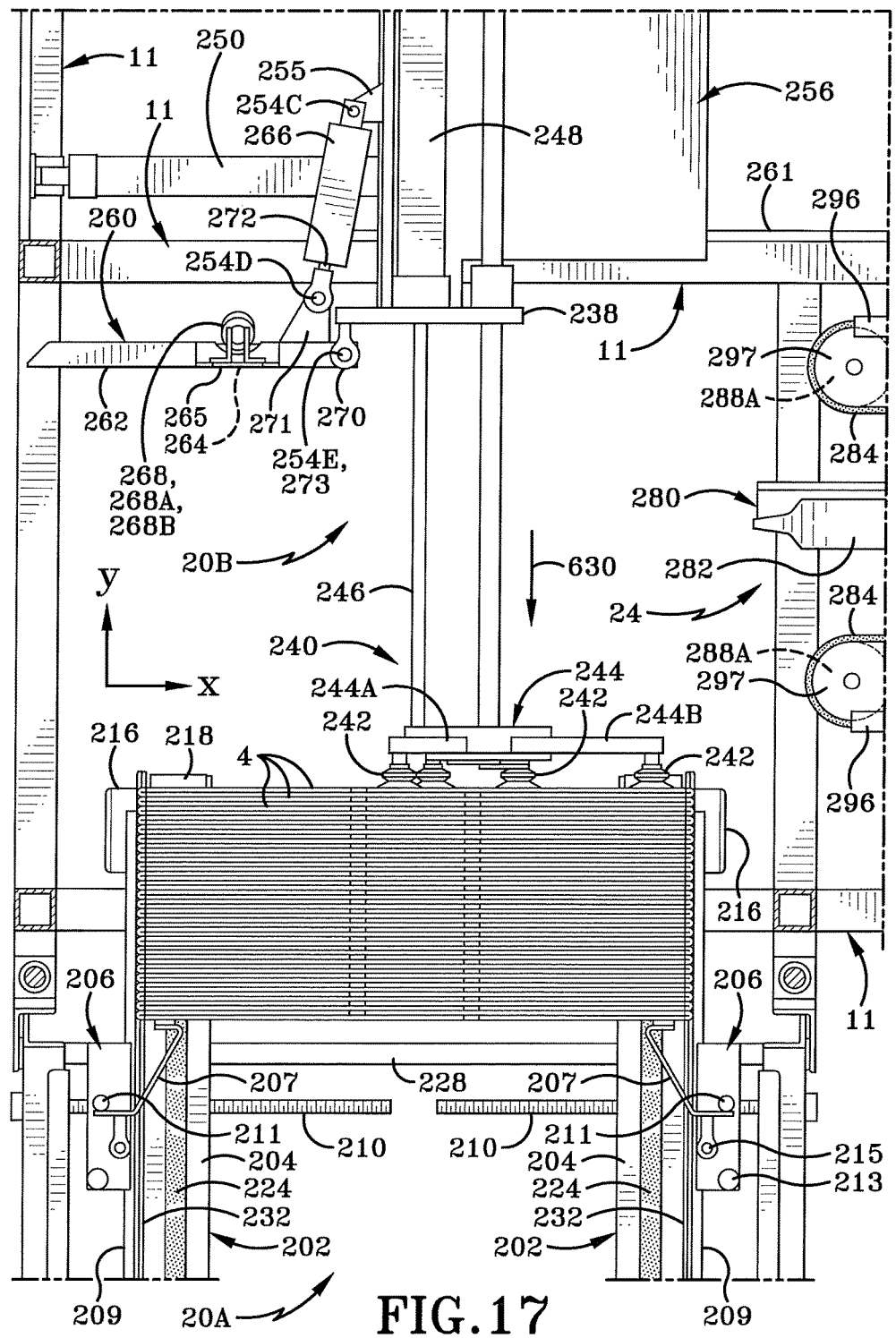
FIG. 17 depicts a top plan view of the lower portion depicting the unfolding process of the large case.

As depicted in FIG. 17, a plurality of empty and folded large cases 4 are stacked on loading module 20A and carried by the conveyor belts above each respective side assembly 202. The suction assembly associated with unfolding module 20B may move in the direction along the Y-axis as indicated by arrow 630. The suction cups releasably attach to a side of the foremost empty and folded large case 4.

Figure 18:
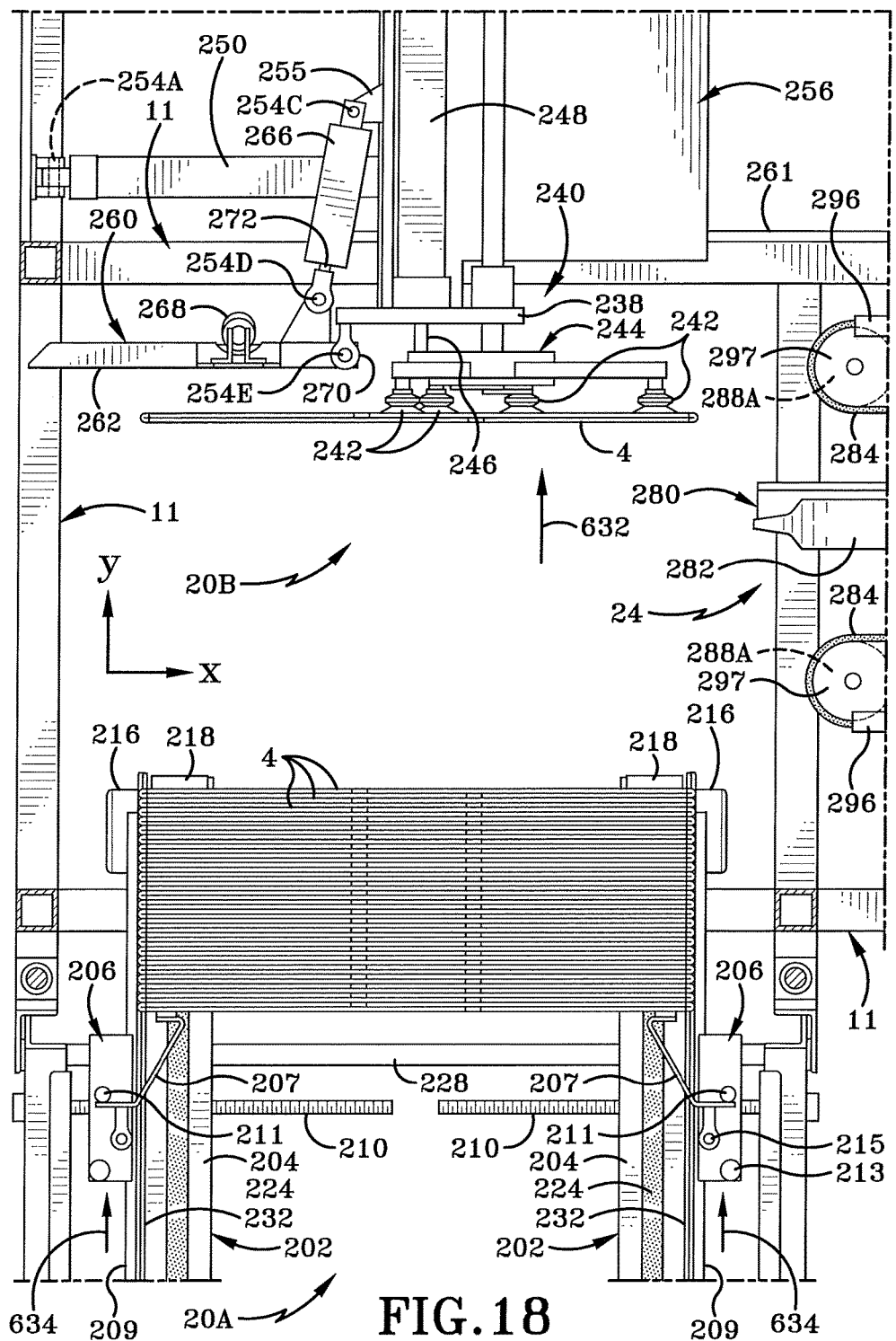
FIG. 18 depicts a similar view to that of FIG. 17 depicting the unfolding process of the large case.

As indicated in FIG. 18, the actuator may retract from its advanced position to a retracted position with the suction cups releasably secured to the folded case 4. The movement of suction assembly occurs in the direction of the Y-axis which is generally indicated by arrow 632. After the single case has been removed from the plurality of stacked, empty, and folded cases, the carriage trolleys operatively connected to each side assembly 202 move in the direction of the Y-axis which is generally indicated by arrow 634. The remaining plurality of folded large cases 4 are held in place by various stop blocks to prevent the folded cases 4 from becoming dislodged.

Figure 19:
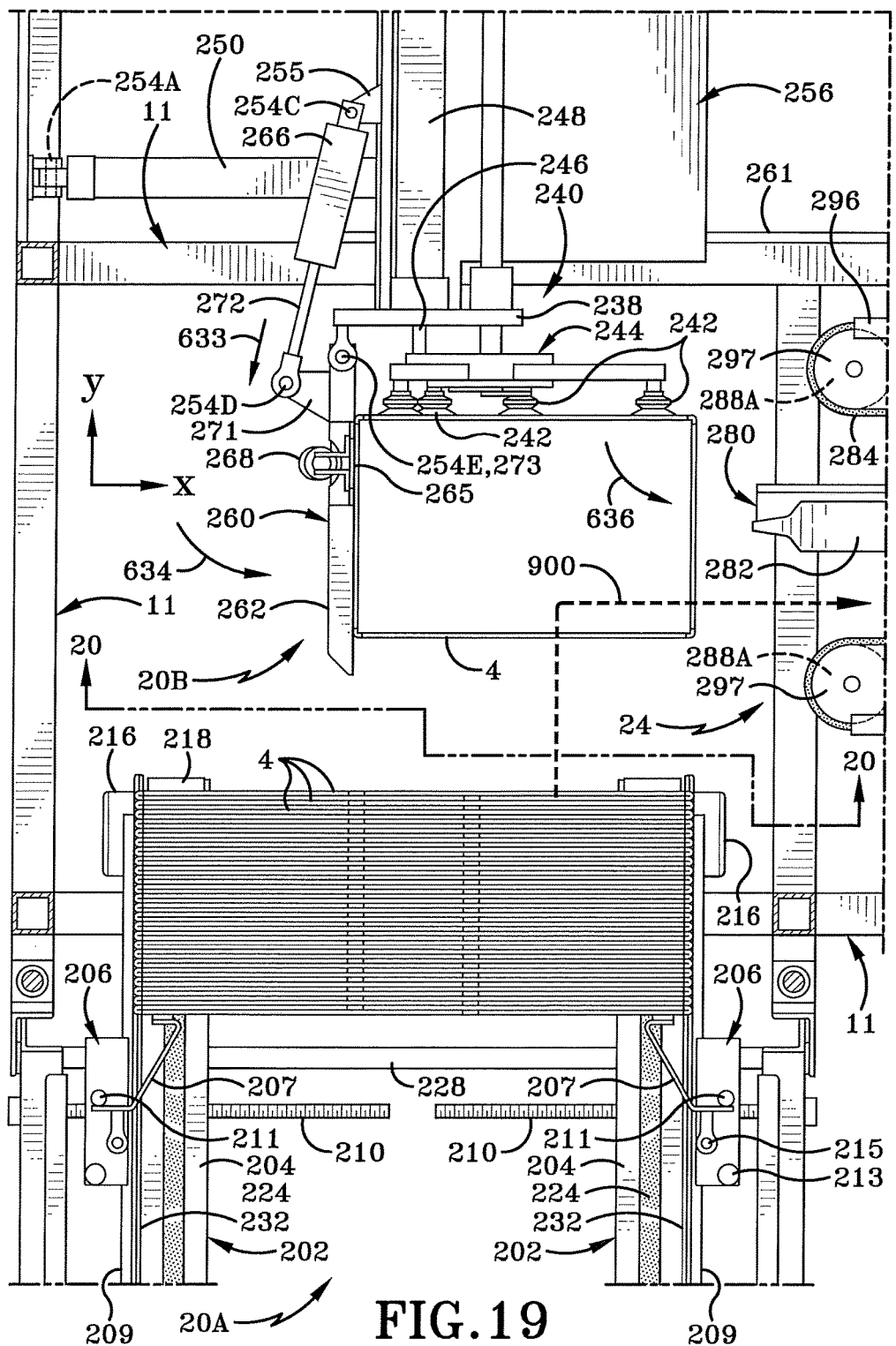
FIG. 19 is a top plan view similar to that of FIG. 17 depicting the unfolding process of the large case.

As depicted in FIG. 19, when the suction assembly is in the retracted position, the actuator 266 extends its piston in the direction of arrow 633. The extension of the piston in the direction of arrow 633 causes rotation of plates 262 about a vertical axis, the rotation of which is indicated by rotational arrow 634. The rotation of plates 262 contacts larger case 4 at its trailing end. The pressing on the trailing end of larger case 4 causes the folded case to become partially unfolded and expand open to a generally rectangular form. The expansion of case 4 is generally indicated at arrow 636. In this position, the suction cups associated with unfolding module 20B and plate 262 are contacting orthogonal sidewalls of case 4 simultaneously.

Figure 20:
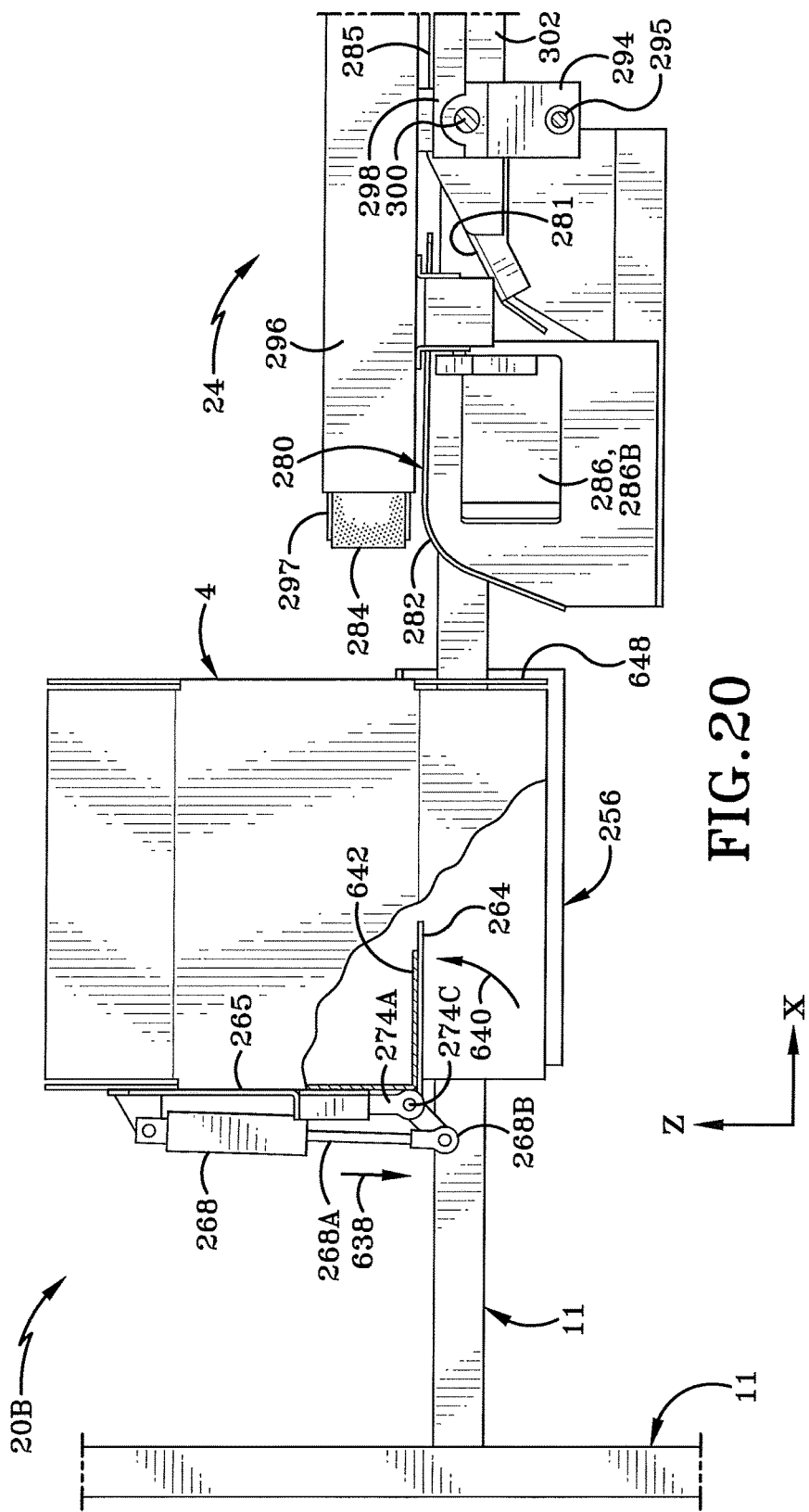
FIG. 20 is a side elevational view taken along line 20-20 in FIG. 19 depicting the large case being folded and formed in the same position as depicted in FIG. 19.
Figure 21:
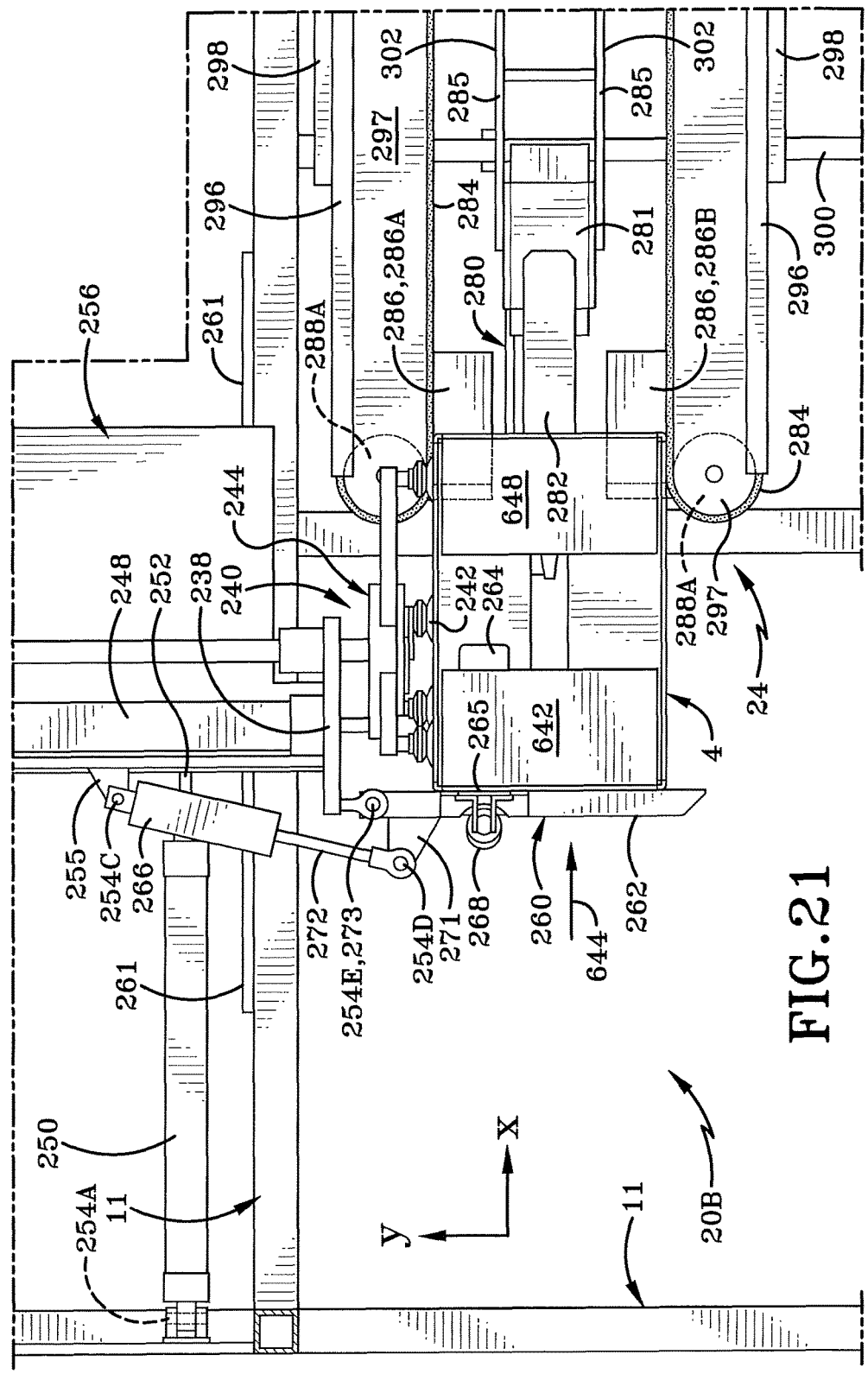
FIG. 21 depicts a top plan view of the large case being case being formed and moving downstream.

As depicted in FIG. 20, after plate 262 has been rotated in the direction of arrow 234, actuator 268 moves its piston generally downward in the direction of arrow 638. The movement of the piston in the downward direction of arrow 238 pivotally lifts plate 264 rotatably upward in the direction of arrow 640. The lifting of plate 264 rotationally upward in the direction of arrow 640 folds the trailing end flap upwardly therewith. The trailing flap is indicated generally as 642. With the trailing flap 642 lifted, actuator 250 is actuated in the direction along the X-axis as indicated by arrow 644. The entire large case unfolding module 20B is translated in the direction of arrow 644 such that the upwardly standing sidewalls of large case 4 begin to contact conveyor belts 284 of conveying module 24. The leading end flap 648 of large case 4 moves in the direction of arrow 644 over the flap folding assembly 280. As the leading end flap 648 moves in the direction of arrow 44, folding plates 286 (FIG. 7) rotate inward between their folded in fold positions as indicated in FIG. 7 to raise the side flaps of large case 4. Inasmuch as folding plates 286 rise to a level higher than that of fixtures 281, 282 when large case 4 is sufficiently downstream along second pathway 900, folding plates 286 may retract to their generally vertical position and the bottom side flaps of large case 4 are drawn upwardly and folded by fixtures 281, 282, respectively, as case 4 is drawn downstream along pathway 900 by conveyor belt 284 of conveying module 24. When conveying module 24 sufficiently grasps large case 4, the suction cups on unfolding assembly 20B release their suction and go back to their neutral position whereby they will be ready to grasp the next case in the cartridge on loading module 20A.

Figure 22:
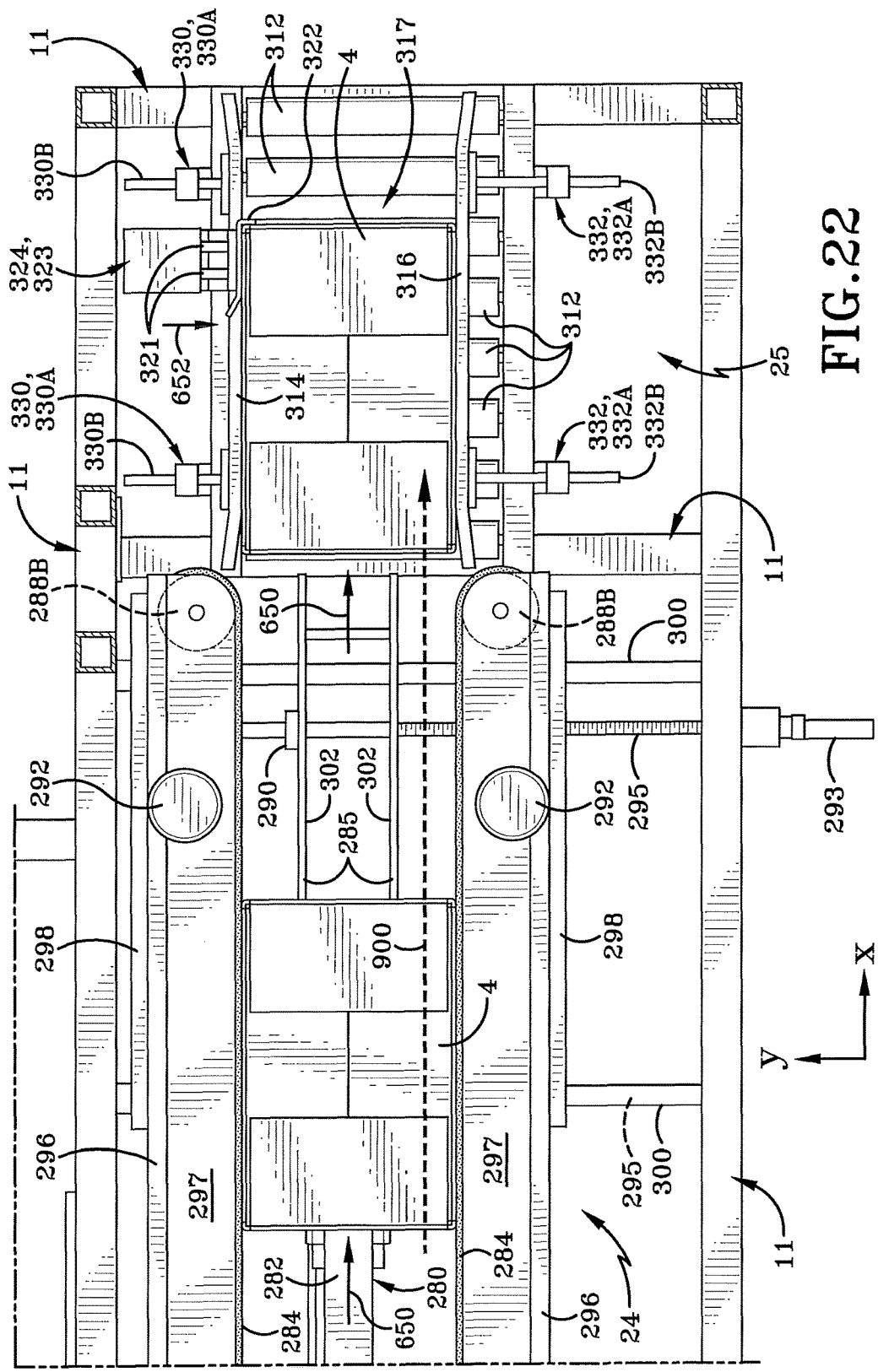
FIG. 22 depicts a top plan view of the large case moving downstream and queued in a receiving module to thereby receive at least one formed and empty bottle carrier therein.

As depicted in FIG. 22, case 4 is shown as moving downstream along second pathway 900 between conveyor belts 284 in the direction of arrow 650 which is generally aligned with the X-axis. As the cases flow along the second pathway 900 in the direction of arrow 650, it is noted that the bottom of case is folded to form a holding area inside large case 4, but the top is open and ready to receive the four aligned carriers 2A-2D. As the large case 4 transfers downstream from conveying modules 24 to the lifting and receiving module 25, one of the side guides, for example side guide 322, may move in the direction of the Y-axis which is generally indicated at arrow 652. This causes some slight pressure on the side of the large case 4 to thereby retain the case in a fixed position atop the rollers 312 and above the lifting assembly 320.

Figure 23:
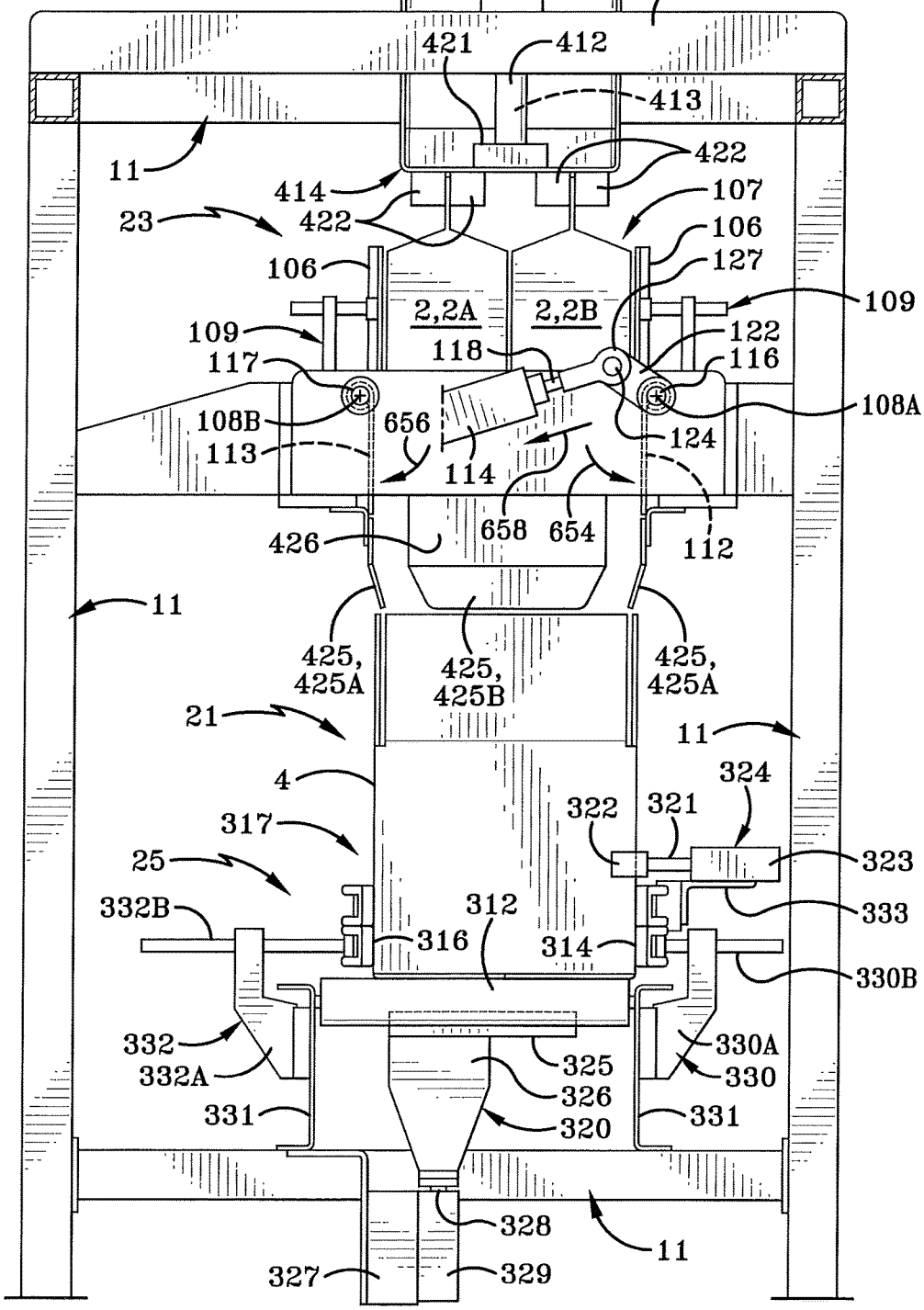

As depicted in FIG. 23, the operation of the combining assembly 21 is provided. Looking to the upper portion 12 of the end view in FIG. 23, it is shown that a plurality of carriers 2 are held in place and aligned with lower aligning blocks 422. In order for drop flaps 112, 113 to respectively open in the rotational direction of arrow 654 and 656, respectively, piston 18 of actuator 114 is moved in the direction of arrow 658. The linkage of actuator 114 through rods 116 and 117 effect the rotational movement about axis 108A, and 108B, respectively. Thus, as flap 112 rotates in the direction of arrow 654, flap 113 rotates in the direction of arrow 156. With flaps 112 and 113 open, chute 426 is effectively defined.

Figure 24:
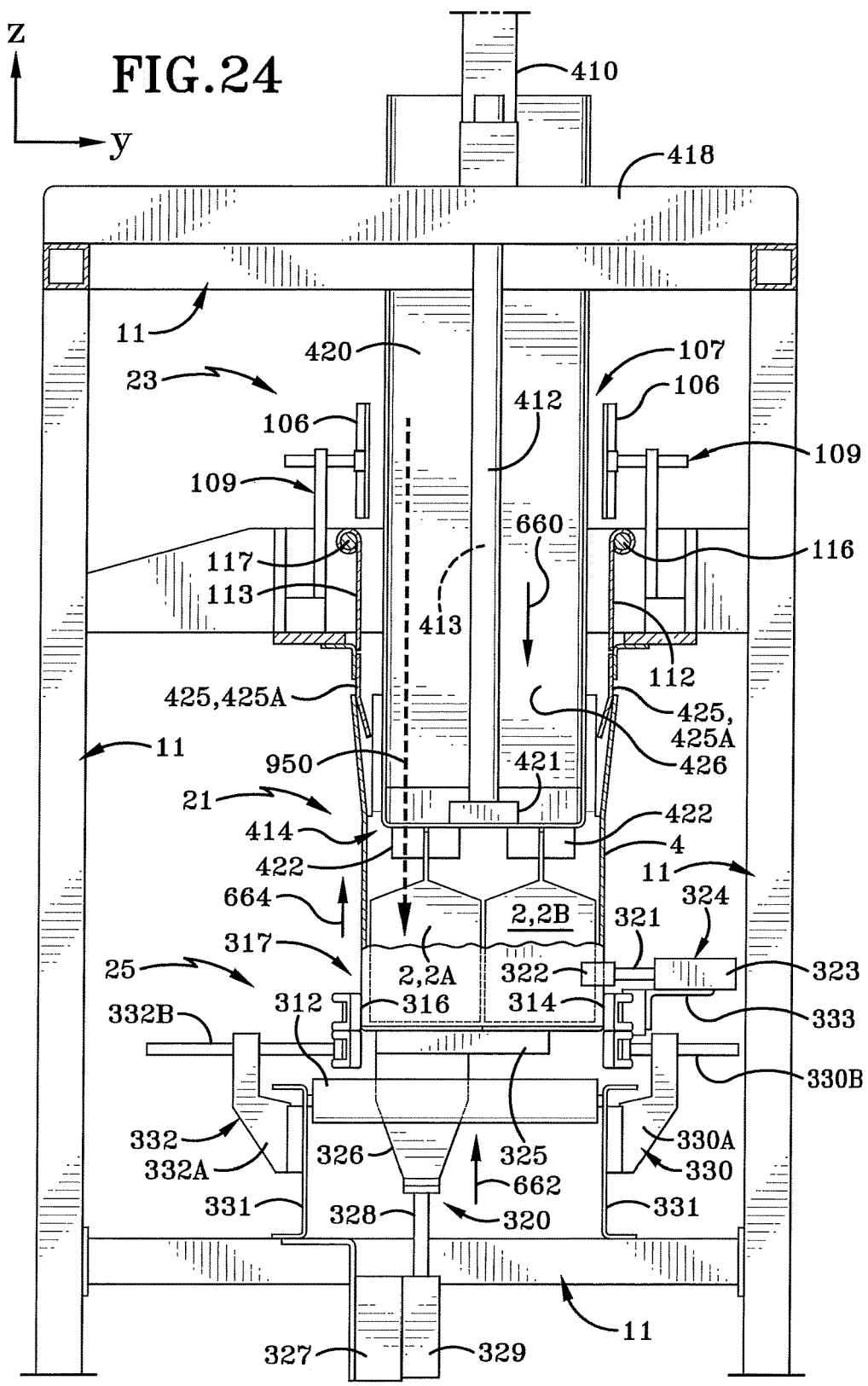
FIG. 24 depicts an end elevation view similar to that of FIG. 8 depicting the operation of the empty and folded bottle carriers being place into the larger case at a junction of the bottle carrier first pathway and the large case second pathway.

The loading of carriers 2 into large case 4 is depicted in FIG. 24. Additionally, FIG. 24 depicts the junction 950 of pathway 800 and second pathway 900. Actuator 410 is moved downwardly in the direction of the Z axis as indicated by arrow 660. Simultaneously, lifting assembly 320 is lifted and moved upwardly in the direction of the Z-axis as indicated by arrow 662 to thereby impart lifting movement of large case 4 upwardly. Rigid member 326 is a U-shaped member which enables lifting bars 324 to fit between slots defined between the rollers 312 contact to bottom of large case 4 as it is lifted as indicated by arrows 664. The upper flaps of large case 4 fold outwardly and extend over and around the downwardly extending guide plates 425.

Figure 25:
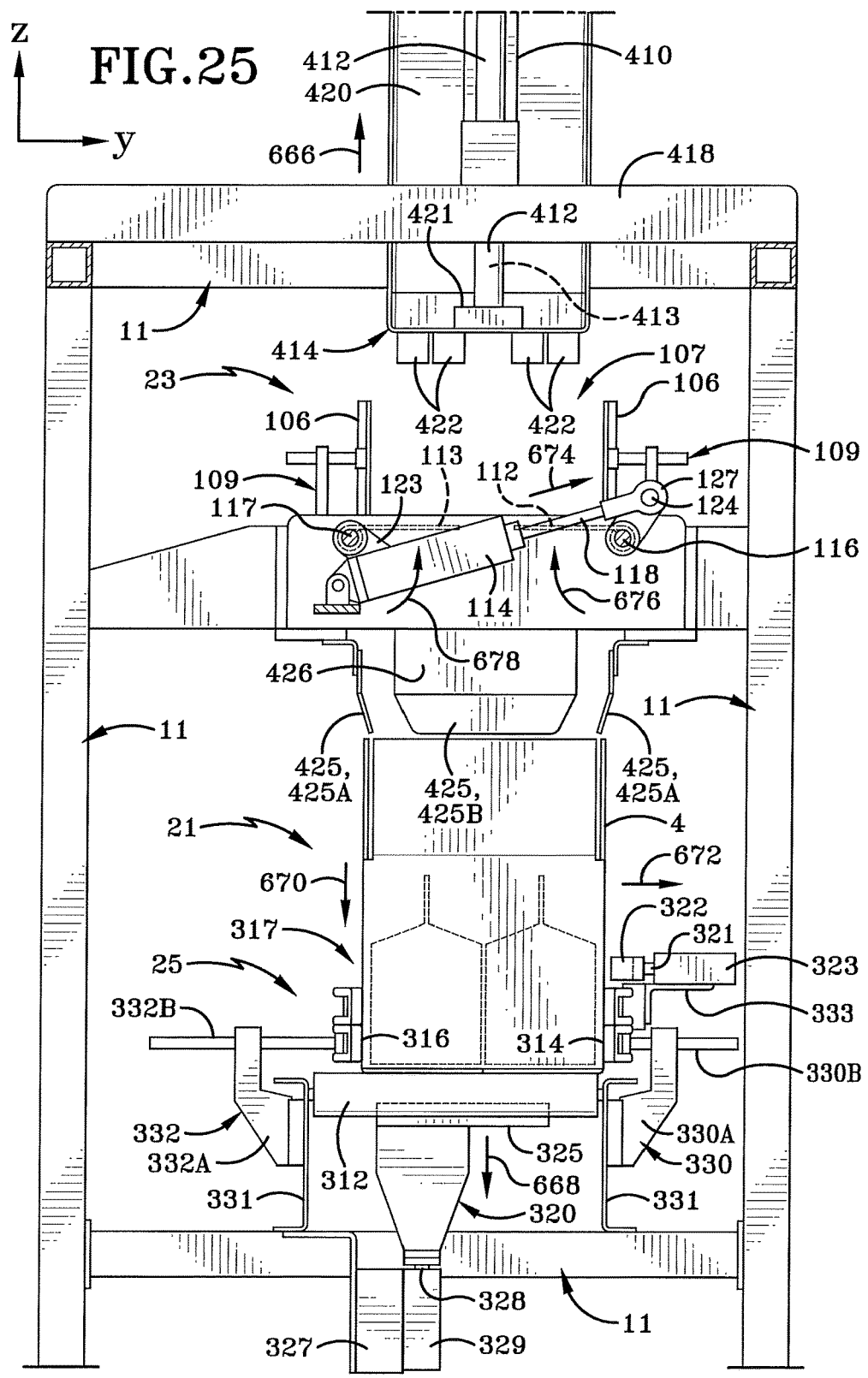
FIG. 25 is an end elevation view similar to that of FIG. 8 depicting the retraction of a plunger and the lowering of the lifting mechanism to enable the case carrying the empty and unfolded bottle carriers downstream along a combined pathway.

In operation and as depicted in FIG. 25, actuator 18 may then be vertically raised in the direction of Z-axis as indicated by arrow 666. The lifting device may be lowered in the direction of arrow 668 effecting downward movement as indicated by arrow 670 of large case 4 to thereby rest the top rollers 312. The side support may be released and moved in the direction of arrow 672 to release the grip it had in securing the large case 4 in place. The large case 4 is effectively loaded with one or more empty carriers and in the particular embodiment shown is loaded with four empty carriers 2A-2D which are ready to be filled with bottles downstream. The flaps 112, 113 may then be lifted to thereby define the floor of loading zone 107 to effectuate and enable additional carriers to be loaded thereafter. Piston 118 moved in the direction of arrow 674 to cause rotational movement of flap 112 in the direction of arrow 676 and simultaneously cause the rotational closure of flap 113 in the direction of arrow 678. Case 4 loaded with carriers 2A-2D may travel to a downstream destination along combined pathway 1000.

Regarding computer logic 500 and logic 502, FIG. 1 broadly depicts an exemplary computing device in which example systems and methods described herein, and equivalents, may operate. The example computing device may be computer 500 that includes a processor, a memory, and input/output ports operably connected by a bus. In one example, the computer 500 may include a carrier and case forming logic 502 configured to form the bottle carriers 2 along the first pathway in the upper portion 12 and form the large cases 4 along the second pathway in the lower portion 14 as described above with reference to FIG. 9 through FIG. 25. In different examples, the logic 502 may be implemented in hardware, software, firmware, and/or combinations thereof. Thus, the logic 502 may provide electronic means (e.g., hardware, software, firmware) for forming the bottle carriers 2 along the first pathway in the upper portion 12 and forming the large cases 4 along the second pathway in the lower portion 14. Logic 502 may be a hardware component attached to the bus, or it is to be appreciated that in one example, the logic 502 could be implemented in the processor.

Generally describing an example configuration of the computer 500, the processor may be a variety of various processors including dual microprocessor and other multiprocessor architectures. A memory may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk may be operably connected to the computer 500 via, for example, an input/output interface (e.g., card, device) and an input/output port. The disk may be, for example, a magnetic disk drive, a solid state disk drive, a floppy disk drive, a tape drive, a Zip drive, a flash memory card, and/or a memory stick. Furthermore, the disk may be a CD-ROM, a CD recordable drive (CD-R drive), a CD rewriteable drive (CD-RW drive), and/or a digital video ROM drive (DVD ROM). The memory can store a process and/or a data. The disk and/or the memory can store an operating system that controls and allocates resources of the computer.

The bus may be a single internal bus interconnect architecture and/or other bus or mesh architectures. While a single bus is illustrated, it is to be appreciated that the computer 500 may communicate with various devices, logics, and peripherals using other busses (e.g., PCIE, SATA, Infiniband, 1394, USB, Ethernet). The bus can be types including, for example, a memory bus, a memory controller, a peripheral bus, an external bus, a crossbar switch, and/or a local bus.

The computer 500 may interact with input/output devices via the i/o interfaces and the input/output ports. Input/output devices may be, for example, a keyboard, a microphone, a pointing and selection device, cameras, video cards, displays, the disk, the network devices, and so on. The input/output ports may include, for example, serial ports, parallel ports, and USB ports.

The computer 500 can operate in a network environment and thus may be connected to the network devices via the i/o interfaces, and/or the i/o ports. Through the network devices, the computer 500 may interact with a network. Through the network, the computer 500 may be logically connected to remote computers. Networks with which the computer 500 may interact include, but are not limited to, a local area network (LAN), a wide area network (WAN), and other networks. The networks may be wired and/or wireless networks.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Figure 26:
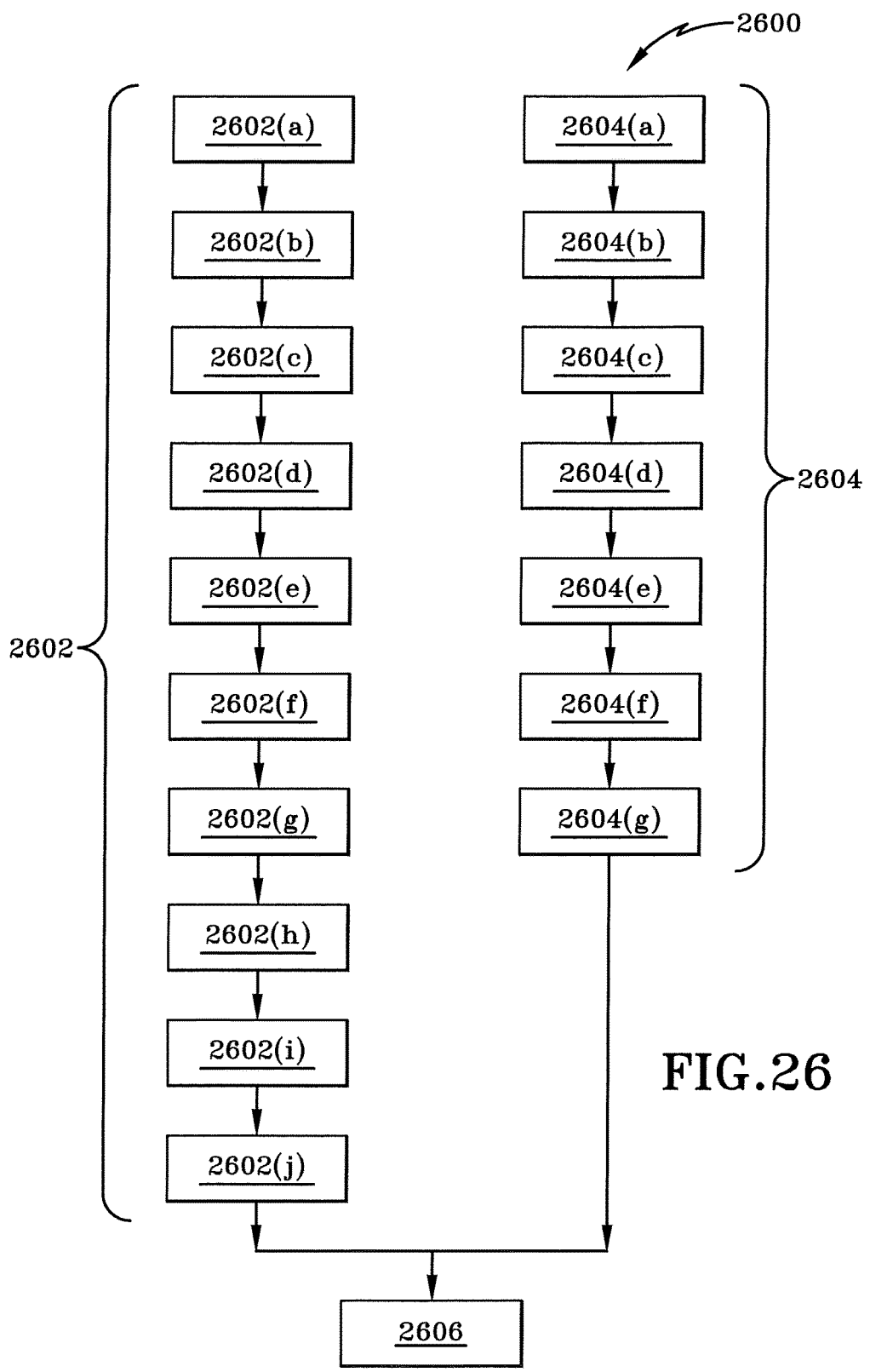
FIG. 26 is a flow chart depicting a first exemplary method in accordance with the present disclosure.

As depicted in the flowchart of FIG. 26, a method of use associated with the present disclosure is generally indicated at 2600. There are two steps that occur simultaneously, namely step 2602 and step 2604. Within step 2602, the step of abutting a plate along a carrier storage assembly to a stack of a plurality of empty and folded bottle carriers is show generally at 2602(*a*). Then, the step of moving a first suction cup in a direction corresponding to a first axis is shown generally at 2602(*b*). Then, the step of grasping a folded bottle carrier from the plurality of empty and folded bottle carriers is shown generally at 2602(*c*). Then, the step of carrying the folded bottle carrier in a direction corresponding to a second axis orthogonal to the first axis is shown generally at 2602(*d*). Then, the step of advancing a second suction assembly in a direction of the first axis is shown generally at 2602(*e*). Then, the step of releasably attaching the second suction to the empty folded bottle carrier simultaneously with the releasable attachment of the first suction assembly to the opposite side of the empty bottle carrier is shown generally at 2602(*f*). Then, the step of retracting the second suction assembly to thereby expand the empty bottle carrier to a partially unfolded state is shown generally at 2602(*g*). Then, the step of punching the partially expanded carrier with a first punching assembly, wherein the punching assembly moves in a direction along the second axis, and simultaneously punching the partially expanded carrier with a second punching assembly, wherein the second punching assembly moves in a direction along a third axis, thereby created an unfolded and locked empty carrier is shown generally at 2602(*h*). Then, the step of selecting a drop point to effectuate movement of the unfolded carrier assembly along one of a first portion of a conveyor belt or a second portion of the conveyor belt is shown generally at 2602(*i*). Then, the step of guiding the unfolded and locked empty carrier to a loading zone defined in a dropping module is shown generally at 2602(*j*).

Simultaneous to step 2062, the step 2604 may include removing a folded case from a stacked plurality of cases on a case loading module is shown generally at 2604(*a*). Then, the step of retracting a suction assembly in the direction of the first axis is shown generally at 2604(*b*). Then, the step of rotating a first plate about a pivot point aligned with the third axis to partially expand the case is shown generally at 2604(*c*). Then, the step of rotating a second plate about a pivot point aligned with the first axis to fold a trailed end flap to partially enclose a bottom of the case is shown generally at 2604(*d*). Then, the step of moving the case over a lifting plate to fold a leading end flap to partially enclose the bottom of the case is shown generally at 2604(*e*). Then, the step of moving the case over lifting fixtures to fold side flaps to enclose the bottom of the case is shown generally at 2604(*f*). Then, the step of moving the case downstream to a receiving module is shown generally at 2604(*g*).

Thereafter, the method 2600 may include the step of simultaneously, pushing a plurality of arrayed carriers downwardly and lifting the case upwardly at a combining assembly to thereby load a plurality of formed and unfolded empty bottle carriers into the case, which is shown generally at 2606.

Figure 27:
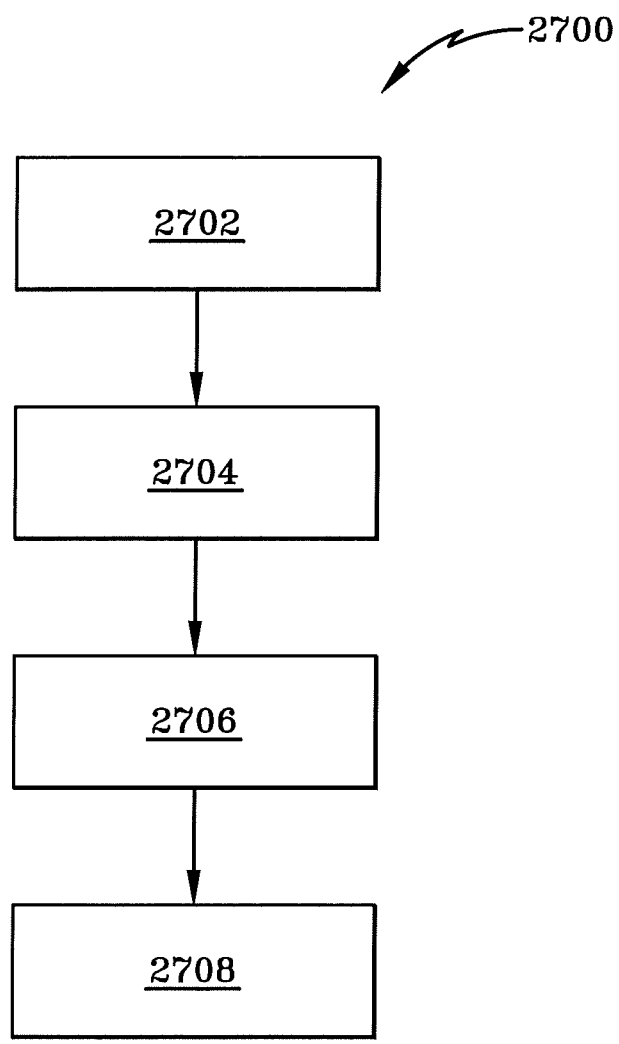
FIG. 27 is a flow chart depicting a second exemplary method in accordance with the present disclosure.

As depicted in the flowchart of FIG. 27, a method of use associated with the present disclosure is generally indicated at 2700. The method 2700 may include the steps of providing a first bottle carrier pathway and an offset second bottle carrier pathway, which is shown generally at 2702. Then, the step of moving a first empty assembled bottle carrier along the first pathway, which is shown generally at 2704. Then, the step of moving a second empty assembled bottle carrier along the second pathway, which is shown generally at 2706. Then, the step of queuing the first and second bottle carriers in a loading zone downstream from the first and second pathways, which is shown generally at 2708.

By way of non-limiting example, an embodiment of the present disclosure may include a packaging machine configured to load empty bottle carriers into a larger case, the machine comprising: a first portion of the machine associated with forming the bottle carriers; a second portion of the machine associated with forming the larger case; and a combining assembly located at a junction of a bottle carrier first pathway and a larger case second pathway, wherein a plurality of formed empty bottle carriers are placed into the larger case at a combining assembly. This exemplary embodiment could also include an upstream direction and a downstream direction associated with the first pathway, wherein empty bottle carriers move from an upstream folded state to a downstream unfolded and formed state; wherein the first portion of the machine includes: a storage assembly configured to receive folded and empty storage bottle carriers; and a first suction assembly downstream from the storage assembly, wherein the first suction assembly and the storage assembly cooperate to remove and transfer at least one folded and empty bottle carrier from the storage assembly to the first suction assembly. This exemplary embodiment could also include a slider moveable along guide rails; and a first suction device carried by the slider, wherein the first suction device releasably secures the at least one folded and empty bottle carrier as the slider moves along the guide rails. This exemplary embodiment could also include a second suction assembly downstream from the first suction assembly, wherein the first and second suction assemblies cooperate to simultaneously releasably attach to the at least one folded and empty bottle carrier. This exemplary embodiment could also include a simultaneous movement of the second suction cup assembly away from the first suction cup assembly while retaining the bottle carrier to thereby transform the carrier from the folded state to a partially unfolded state. This exemplary embodiment could also include a second suction device moveable between a retracted position and an advanced position, wherein the second suction device is configured to releasably attach to an opposite side of the at least one folded and empty bottle carrier relative to the first suction device; wherein the second suction device remains releasably attached to the at least one folded and empty bottle carrier while moving from the advanced position to the retracted position; and a semi-unfolded state associated with the at least one bottle carrier when releasably attached to the first suction device and releasable attached to the second suction device in the retracted position. This exemplary embodiment could also include a first punching assembly positioned downstream from the second suction assembly, wherein the punching device is configured to square the at least one carrier case from a semi-folded position to an unfolded position. This exemplary embodiment could also include a tip moveable between a first position and second position, wherein the tip movement from the first position to the second position is against movement of the at least one carrier case along the first pathway. This exemplary embodiment could also include a second punching assembly positioned beneath the carrier configured to contact a bottom portion of the carrier to thereby lock the bottom portion for later support of bottles loaded in empty slots defined by the carrier. This exemplary embodiment could also include a conveyor assembly positioned downstream from the first and second punching assemblies and operatively connected with the combining assembly, wherein the conveyor assembly moves the at least one bottle carrier in the unfolded state downstream to the combining assembly. This exemplary embodiment could also include a conveyor belt; a divider plate extending lengthwise above the conveyor belt to define a first conveyor portion and a second conveyor portion; wherein the first conveyor portion forms a first portion of the first pathway and the second conveyor portion belt forms a second portion of first pathway; first pathway logic selectively directing the at least one carrier along one of: (i) the first portion of the first pathway, and (ii) the second portion of the second pathway. This exemplary embodiment could also include wherein the at least one carrier only travels along a single portion first pathway at a single time. This exemplary embodiment could also include a case loading module including a plurality of empty folded larger cases, wherein each case is larger than one of the bottle carriers. This exemplary embodiment could also include a case suction assembly positioned downstream from the case loading module configured to remove at least one empty folded case from the plurality of empty folded cases. This exemplary embodiment could also include an unfolding assembly positioned downstream from the case suction assembly, wherein the unfolding assembly assembles at least one bottom flap on the at least one empty folded larger case thereby creating an enclosed bottom and leaving top flaps unfolded to create a top opening for the empty larger case. This exemplary embodiment could also include a case conveyor assembly positioned downstream from the flap folding assembly, wherein the case conveyor assembly carries the at least one empty case in a partially folded position from the flap folding assembly to the combining assembly where empty bottle carriers are placed into the partially folded larger case. This exemplary embodiment could also include a bottle carrier drop zone defining a terminal end of the first pathway, the drop zone positioned directly above a larger case receiving zone defining a terminal end of the second pathway, wherein empty bottle carriers in the bottle carrier drop zone are loaded into the larger case at the junction of the first and second pathways; and a combined pathway extending downstream from the junction, wherein the large case filed with unfolded bottle carriers moves along the combined pathway to a downstream destination. This exemplary embodiment could also include a plunger moveable between a retracted first position and an advanced second position; wherein the plunger is vertically aligned and the plunger moves downwardly from the first position to the second position. This exemplary embodiment could also include a lifting platform moveable between a lowered first position and a lifted second position; wherein the platform is directly beneath the plunger and moves cooperatively therewith such that downward movement of the plunger is associated with upward movement of the platform. This exemplary embodiment could also include, in combination with a downstream destination separate and distinct from the packaging machine, wherein at the downstream destination bottles are loaded into the empty slots formed by the bottle carriers inside the larger case.

Further, by way of non-limiting example, an embodiment of the present disclosure may include a method comprising the steps of: (1) performing the following first set of steps in a first portion of a packaging machine: (a) abutting a plate along a carrier storage assembly to a stack of a plurality of empty and folded bottle carriers; (b) moving a first suction cup in a direction corresponding to a first axis; (c) grasping a folded bottle carrier from the plurality of empty and folded bottle carriers; (d) carrying the folded bottle carrier in a direction corresponding to a second axis orthogonal to the first axis; (e) advancing a second suction assembly in a direction of the first axis; (f) releasably attaching the second suction to the empty folded bottle carrier simultaneously with the releasable attachment of the first suction assembly to the opposite side of the empty bottle carrier; (g) retracting the second suction assembly to thereby expand the empty bottle carrier to a partially unfolded state; (h) punching the partially expanded carrier with a first punching assembly, wherein the punching assembly moves in a direction along the second axis, and simultaneously punching the partially expanded carrier with a second punching assembly, wherein the second punching assembly moves in a direction along a third axis, thereby created an unfolded and locked empty carrier; (i) selecting a drop point to effectuate movement of the unfolded carrier assembly along one of a first portion of a conveyor belt or a second portion of the conveyor belt; (j) guiding the unfolded and locked empty carrier to a loading zone defined in a dropping module; (2) simultaneous to (1), performing the following second set of steps in a second portion of the packaging machine: (a) removing a folded large case from a stacked plurality of large cases on a large case loading module; (b) retracting a suction assembly in the direction of the first axis; (c) rotating a first plate about a pivot point aligned with the third axis to partially expand the case; (d) rotating a second plate about a pivot point aligned with the first axis to fold a trailed end flap to partially enclose a bottom of the large case; (e) moving the large case over a lifting plate to fold a leading end flap to partially enclose the bottom of the large case; (f) moving the large case over lifting fixtures to fold side flaps to enclose the bottom of the large case; (g) moving the large case downstream to a receiving module; and (3) simultaneously, pushing a plurality of arrayed carriers downwardly and lifting the large case upwardly at a combining assembly to thereby load a plurality of formed and unfolded empty bottle carriers into the large case.

Further, by way of non-limiting example, an embodiment of the present disclosure may include a method of forming a case filled with empty bottle carriers comprising the steps of: unfolding a folded first carrier from a plurality of folded carriers; unfolding a folded second carrier from the plurality of folded carriers, wherein a first portion of a packaging machine accomplishes the steps of unfolding the folded first and second carriers; moving the unfolded first carrier along a first portion of a first pathway to a loading zone; moving the unfolded second carrier along a second portion of the first pathway to the loading zone, wherein the first and second carriers are empty and arranged side-by-side in the loading zone; inserting the first and second carrier into a larger case; and inserting bottles into empty slots formed in the first and second carriers. This exemplary embodiment could also include unfolding the larger case from a plurality of larger cases simultaneous to the step of unfolding the first carrier case, wherein a second portion of the packaging machine accomplishes the step of unfolding the larger case.

Further, by way of non-limiting example, an embodiment of the present disclosure may include a packaging machine having offset paths comprising: a first path for moving empty bottle carriers and transforming the empty bottles carriers from a folded first position to an unfolded second position, wherein the carrier unfolded second position is adapted to receive bottles in slots defined by the bottle carrier; and a second path offset from the first path for moving larger cases and transforming the cases from a folded first position to an unfolded second position, wherein the case unfolded second position is adapted to received empty unfolded bottle carriers therein. This exemplary embodiment could also include a combined pathway extending downstream from a junction of the first and second paths. This exemplary embodiment could also include an x-axis associated with the first and second paths; a y-axis associated with the first and second paths; a z-axis associated with the first and second paths; and a first carrier storage assembly defining a first portion of the first path permitting directional movement along the y-axis and remaining constant relative to the x-axis and the z-axis. This exemplary embodiment could also include a first suction assembly defining a second portion of the first path permitting directional movement along the x-axis and the y-axis and remaining constant relative to the z-axis. This exemplary embodiment could also include a second suction assembly defining a third portion of the first path permitting directional movement along the y-axis and remaining constant relative to the x-axis. This exemplary embodiment could also include first and second punching assemblies positioned in a carrier opening area defining a fourth portion of the first path, wherein the first punching assembly moves a first punching tip in a direction along the x-axis and the second punching assembly moves a second punching tip in a direction along the z-axis. This exemplary embodiment could also include a tapered dropping flange positioned beneath the second suction assembly relative to the z-axis, wherein the tapered dropping flange defines a fifth portion of the first path permitting a carrier to be dropped from the second suction assembly in a direction along the z-axis and impact the tapered dropping flange to thereby effect movement in a direction along the x-axis. This exemplary embodiment could also include a carrier conveyor assembly positioned downstream from the tapered dropping flange and defining a sixth portion of the first path, wherein the carrier conveyor assembly permits movement in a direction along the x axis and substantially precludes movement relative to the y-axis and the z-axis. This exemplary embodiment could also include a divider plate thereby dividing a conveyor belt into two sections, wherein packaging computer logic selectively assigns the carrier to move along one of the two conveyor sections. This exemplary embodiment could also include a dropping module receiving a plurality of queued and formed carriers and the dropping module permitting movement in a downward direction along the z-axis. This exemplary embodiment could also include a large case loading module defining a first portion of the second path permitting movement of the larger cases in a direction along the y-axis and substantially precluding movement of the larger cases relative to the x-axis; a large case folding module defining a second portion of the second path permitting movement of the larger cases in a direction along the x-axis, y-axis, and z-axis; a larger case conveyor assembly defining a third portion of the second path permitting movement of the larger cases in a direction along the x-axis and substantially precluding movement relative to the y-axis and the z-axis; and a lifting module defining a fourth portion of the second path permitting movement in a direction along the z-axis.

Further, by way of non-limiting example, an embodiment of the present disclosure may include a packaging machine configured to load empty bottle carriers into a larger case, the machine comprising: an empty six-pack bottle carrier first pathway; a larger case second pathway offset from the first pathway; and a combining assembly located at a junction of the first pathway and the second pathway, wherein a plurality of empty bottle carriers are placed into the larger case at the combining assembly. This exemplary embodiment could also include that the first pathway is positioned above the second pathway. This exemplary embodiment could also include a terminal end of the first pathway and a terminal end of the second pathway positioned directly above that of the first pathway. This exemplary embodiment could also include a loading zone adjacent the terminal end of the first pathway; a receiving zone adjacent the terminal end of the second pathway; wherein the loading zone and the receiving zone collectively define a portion of the combining assembly.

Further, by way of non-limiting example, an embodiment of the present disclosure may include a packaging machine having offset paths comprising: a first conveying pathway (defined by first conveyor section 88A) by for moving empty assembled bottle carriers from an upstream first position to a downstream second position; and a second conveying pathway (defined by second conveyor section 88B) offset from the first conveying pathway for moving empty assembled bottle carriers from the upstream first position to the downstream second position. In some instances the first and second conveying pathways are parallel. Additionally, some embodiments of this example may include conveyor belt 88 and divider plate 96 aligned lengthwise adjacent the conveyor belt, wherein the divider plate defines the first conveying pathway on a first side of the conveyor belt (see section 88A) and the second conveying pathway on a second side of the conveyor belt (see section 88B). This example may include the dropping module positioned downstream from the first and second conveying pathways, the dropping module configured to receive a plurality of queued and assembled carriers and the dropping module permitting movement in a downward direction along the z-axis. Additionally, this example may further include the tapered dropping flange positioned upstream from the first and second conveying pathways, wherein the tapered dropping flange permits a carrier to be dropped from above in a direction along the z-axis and impact the tapered dropping flange 101 to thereby effect movement in a direction along the x-axis and onto one of the first and second conveying pathways. This example may also include a suction assembly (i.e., the second suction assembly) to selectively drop the assembled bottle carrier from above onto the tapered dropping flange 101. The carrier conveying logic 502 operatively connected to computer 500 selectively controls the dropping placement of assembled carriers onto the first and second conveying pathways. Logic 502 includes instructions that direct the suction assembly to drop a first assembled carrier 2A onto the first conveying pathway and then drop a second assembled carrier 2B onto the second conveying pathway. The logic 502 instructions also direct the suction assembly to drop a third assembled carrier 2C onto the first conveying pathway after the second assembled carrier was dropped and then drop a fourth assembled carrier 2D onto the second conveying pathway. Thus, a 2×2 arrayed configuration of the first, second, third, and fourth carriers is defined after the four carriers have been dropped and are then supported by the dropping module.

Alternatively, logic 502 instructions may direct the suction assembly to drop a first assembled 2A carrier onto the first conveying pathway (i.e., along first conveyor section 88A) and then drop a second assembled carrier 2B onto the first conveying pathway (i.e., along first conveyor section 88A). Then, the instructions may direct the suction assembly to drop a third assembled carrier 2C onto the second conveying pathway (i.e., along second conveyor section 88B) after the second assembled carrier was dropped onto the first conveyor pathway and then drop a fourth assembled carrier 2D onto the second conveying pathway.

Further, by way of non-limiting example, an embodiment of the present disclosure may include a method of moving empty assembled bottle carriers from an upstream first position to a downstream second position comprising the steps of: providing a first bottle carrier pathway and an offset second bottle carrier pathway; moving a first empty assembled bottle carrier along the first pathway; moving a second empty assembled bottle carrier along the second pathway; queuing the first and second bottle carriers in a loading zone downstream from the first and second pathways. This exemplary method may also include moving a third empty assembled bottle carrier along the first pathway; moving a court empty assembled bottle carrier along the second pathway; wherein the first, second, third, and fourth bottle carriers are queued in a loading zone. This method may also include loading the queued bottle carriers into a case, wherein the carriers are arranged in a 2×2 configuration within the case. Further, this exemplary method may provide that the first and second bottle carrier pathways are offset parallel, and the method further comprising the steps of: loading the first carrier onto the first pathway, wherein the loading of the first carrier is based, at least in part, on carrier conveying logic including instructions that direct the placement of the first carrier onto the first pathway; and loading the second carrier onto the second pathway after the loading of the first carrier, wherein the loading of the second carrier is based, at least in part, on the instructions that direct the placement of the second carrier onto the second pathway.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A packaging machine comprising:
    a first conveying pathway for moving empty assembled bottle carriers from an upstream first position to a downstream second position;
    a second conveying pathway parallel to the first conveying pathway for moving empty assembled bottle carriers from the upstream first position to the downstream second position; and
    an empty assembled bottle carrier loading zone downstream from the first and second conveying pathways receiving empty assembled bottle carriers in at least a 2×2 configuration adapted to be loaded into a case.

2. The packaging machine of claim 1, further comprising:
    a conveyor belt; and
    a divider plate aligned lengthwise adjacent the conveyor belt, wherein the divider plate defines the first conveying pathway on a first side of the conveyor belt and the second conveying pathway on a second side of the conveyor belt.

3. The packaging machine of claim 2, further comprising:
    an x-axis associated with the first and second conveying pathways;
    a y-axis associated with the first and second conveying pathways;
    a z-axis associated with the first and second conveying pathways; and
    a dropping module positioned downstream from the first and second conveying pathways defining a portion of the empty assembled bottle carrier loading zone, the dropping module configured to receive a plurality of queued and assembled carriers and the dropping module permitting movement in a downward direction along the z-axis.

4. The packaging machine of claim 3, further comprising a tapered dropping flange positioned upstream from the first and second conveying pathways, wherein the tapered dropping flange permits a carrier to be dropped from above in a direction along the z-axis and impact the tapered dropping flange to thereby effect movement in a direction along the x-axis and onto one of the first and second conveying pathways.

5. The packaging machine of claim 4, further comprising a suction assembly to selectively drop the assembled bottle carrier from above onto the tapered dropping flange.

6. The packaging machine of claim 5, further comprising:
    a first side guide positioned adjacent a first side of the conveyor belt;
    a second side guide positioned adjacent the a second side of the conveyor belt; and wherein the divider plate is positioned between the first and second guides.

7. The packaging machine of claim 6, wherein the first and second guides taper inwardly towards the divider plate to narrow the first and second conveyor pathways.

8. The packaging machine of claim 5, further comprising carrier conveying logic operatively connected to a computer, wherein the logic selectively controls the dropping placement of assembled carriers onto the first and second conveying pathways.

9. The packaging machine of claim 8, wherein the carrier conveying logic includes instructions that direct the suction assembly to drop a first assembled carrier onto the first conveying pathway and then drop a second assembled carrier onto the first conveying pathway.

10. The packaging machine of claim 9 wherein the instructions direct the suction assembly to drop a third assembled carrier onto the second conveying pathway after the second assembled carrier was dropped onto the first conveyor pathway and then drop a fourth assembled carrier onto the second conveying pathway.

11. The packaging machine of claim 10, further comprising a 2×2 arrayed configuration of the first, second, third, and fourth carriers supported by the dropping module.

12. The packaging machine of claim 8, wherein the carrier conveying logic includes instructions that direct the suction assembly to drop a first assembled carrier onto the first conveying pathway and then drop a second assembled carrier onto the second conveying pathway.

13. The packaging machine of claim 12 wherein the instructions direct the suction assembly to drop a third assembled carrier onto the first conveying pathway after the second assembled carrier was dropped and then drop a fourth assembled carrier onto the second conveying pathway.

14. The packaging machine of claim 13, further comprising a 2×2 arrayed configuration of the first, second, third, and fourth carriers supported by the dropping module.

15. A method of moving empty assembled bottle carriers from an upstream first position to a downstream second position comprising the steps of:
providing a bottle carrier first pathway and a bottle carrier second pathway;
moving a first empty assembled bottle carrier along the bottle carrier first pathway;
moving a second empty assembled bottle carrier along the bottle carrier second pathway;
moving a third empty assembled bottle carrier along the bottle carrier first pathway;
moving a fourth empty assembled bottle carrier along the bottle carrier second pathway; and
loading the first, second, third, and fourth empty assembled bottle carriers into a case, wherein the first, second, third, and fourth empty assembled bottle carriers are arranged in a 2×2 configuration within the case.

16. The method of claim 15, wherein the bottle carrier first and second pathways are parallel, and the method further comprising the steps of:
loading the first empty assembled bottle carrier onto the bottle carrier first pathway, wherein the loading of the first empty assembled bottle carrier is based, at least in part, on carrier conveying logic including instructions that direct the placement of the first empty assembled bottle carrier onto the bottle carrier first pathway; and
loading the second empty assembled bottle carrier onto the bottle carrier second pathway after the loading of the first empty assembled bottle carrier, wherein the loading of the second empty assembled bottle carrier is based, at least in part, on the instructions that direct the placement of the second empty assembled bottle carrier onto the bottle carrier second pathway.

17. A packaging machine comprising:
a first conveying pathway to move bottle carriers from an upstream first position to a downstream second position;
a second conveying pathway to move bottle carriers from the upstream first position to the downstream second position;
a conveyor belt including a first side and a second side; and
a divider plate including first and second surfaces extending adjacent the conveyor belt between the first and second sides, wherein the divider plate divides the conveyor belt into the first conveying pathway and the second conveying pathway;
wherein the bottle carriers are adapted to move along the first conveying pathway and the second conveying pathway.

18. The packaging machine of claim 17, further comprising a loading zone downstream from the first and second conveying pathways adapted to receive the bottle carriers in one of a 2×2 configuration and a 2×3 configuration for loading into a case.

19. The packaging machine of claim 17, further comprising a dropping assembly to selectively drop at least one bottle carrier from above into a case.

* * * * *